(12) United States Patent
Kim et al.

(10) Patent No.: US 11,144,650 B2
(45) Date of Patent: Oct. 12, 2021

(54) DEVICE AND METHOD OF PROVISIONING SECURE INFORMATION

(71) Applicant: Samsung Electronics Co., Ltd., Suwon-si (KR)

(72) Inventors: Ki-Tak Kim, Yongin-si (KR); Ki-Seok Bae, Hwaseong-si (KR); Jin-Su Hyun, Seoul (KR); Young-Moon Sonn, Seoul (KR); Hyo-Sun Hwang, Bucheon-si (KR)

(73) Assignee: Samsung Electronics Co., Ltd.

( * ) Notice: Subject to any disclaimer, the term of this patent is extended or adjusted under 35 U.S.C. 154(b) by 207 days.

(21) Appl. No.: 16/426,848

(22) Filed: May 30, 2019

(65) Prior Publication Data

US 2020/0110888 A1    Apr. 9, 2020

(30) Foreign Application Priority Data

Oct. 4, 2018    (KR) .................. 10-2018-0118497

(51) Int. Cl.
| | |
|---|---|
| H04L 29/04 | (2006.01) |
| G06F 21/00 | (2013.01) |
| G06F 21/60 | (2013.01) |
| H04L 9/08 | (2006.01) |

(52) U.S. Cl.
CPC .......... *G06F 21/602* (2013.01); *H04L 9/0866* (2013.01); *H04L 9/0894* (2013.01)

(58) Field of Classification Search
CPC ........ G06F 21/602; G06F 21/72; G06F 21/73; H04L 9/0866; H04L 9/0894
See application file for complete search history.

(56) References Cited

U.S. PATENT DOCUMENTS

| | | | |
|---|---|---|---|
| 7,920,706 B2 * | 4/2011 | Asokan ................ | H04L 9/0894 380/277 |
| 8,565,748 B2 * | 10/2013 | Knowles ............... | H04W 8/245 455/419 |
| 9,225,512 B1 * | 12/2015 | Trimberger .......... | H04L 9/0866 |
| 9,226,127 B2 | 12/2015 | Spitz et al. | |
| 9,838,201 B2 * | 12/2017 | Cotta ................... | H04L 9/0631 |
| 2010/0169968 A1 * | 7/2010 | Shanbhogue ....... | G06F 12/1408 726/22 |
| 2014/0093074 A1 * | 4/2014 | Gotze .................. | H04L 9/3278 380/45 |
| 2014/0189365 A1 | 7/2014 | Cox et al. | |
| 2015/0123702 A1 | 5/2015 | McKinley et al. | |
| 2015/0188707 A1 | 7/2015 | Gehrer et al. | |
| 2016/0006570 A1 * | 1/2016 | Falk ..................... | H04L 9/0866 380/44 |
| 2016/0127333 A1 * | 5/2016 | Sood ................... | H04L 63/0272 380/44 |
| 2018/0004444 A1 | 1/2018 | Murray et al. | |
| 2018/0018288 A1 * | 1/2018 | Dewan ................ | G06F 3/0637 |

* cited by examiner

*Primary Examiner* — Lisa C Lewis
(74) *Attorney, Agent, or Firm* — Myers Bigel, P.A.

(57) ABSTRACT

A semiconductor device for provisioning secure information of a demander includes a device key storage configured to store a device key provisioned by a supplier of the semiconductor device, a master key generator configured to generate, based on the device key and demander data provisioned by the demander, a master key of the demander by using a first operation shared with the supplier and a second operation shared with the demander, and a cryptographic engine configured to perform a cryptographic operation based on the master key.

15 Claims, 12 Drawing Sheets

DEVICE AND METHOD OF PROVISIONING SECURE INFORMATION

CROSS-REFERENCE TO RELATED APPLICATION

This application claims priority under 35 U.S.C. § 119 to Korean Patent Application No. 10-2018-0118497, filed on Oct. 4, 2018, in the Korean Intellectual Property Office, the disclosure of which is incorporated herein in its entirety by reference.

BACKGROUND

It may be necessary to provision secure information that should be protected from external inappropriate access securely into a product. For example, a demander of a component (or a part) included in a product, e.g., a manufacturer of the product, may receive the component into which its own secure information is inserted from a supplier of the component, or may provision its own secure information into the component during manufacture of the product. Secure information may be incorporated into the product relatively safely, while the secure information possessed by the demander of the component may be exposed to the supplier of the component and may not be easily changed according to a change in an environment in which the component is used. The demander of the component may easily change its own secure information, whereas the secure information may not be protected properly from inappropriate access to the product due to insecure access to an interface for provisioning the secure information.

SUMMARY

The inventive concept provides a device and method of provisioning secure information possessed by a demander of a semiconductor device easily and securely into the semiconductor device.

According to an aspect of the inventive concept, there is provided a semiconductor device for provisioning secure information of a demander, including a device key storage configured to store a device key provisioned by a supplier of the semiconductor device, a master key generator configured to generate, based on the device key and demander data provisioned by the demander, a master key of the demander by using a first operation shared with the supplier and a second operation shared with the demander, and a cryptographic engine configured to perform a cryptographic operation based on the master key.

According to another aspect of the inventive concept, there is provided a method of operating a semiconductor device for provisioning secure information of a demander, the method including receiving and storing a device key, receiving at least one demander identifier and an encrypted master key of the demander, generating an encryption key based on the device key and the at least one demander identifier, generating a master key by decrypting the encrypted master key with the encryption key, and performing a cryptographic operation based on the master key.

According to another aspect of the inventive concept, there is provided a method of provisioning secure information of a demander into a semiconductor device, the method including provisioning, by a supplier of the semiconductor device, a device key into the semiconductor device, generating, by the supplier, a primary key based on the device key and a primary demander identifier provided by a primary demander, and providing, by the supplier, the primary key to the primary demander.

According to another aspect of the inventive concept, there is provided a method of provisioning secure information of a demander into a semiconductor device, the method including providing a demander identifier to a supplier of the semiconductor device or a component including the semiconductor device, receiving from the supplier of the semiconductor device an encryption key generated based on the demander identifier and a device key provisioned into the semiconductor device, encrypting a master key with the encryption key and provisioning the demander identifier and an encrypted master key to the semiconductor device.

According to another aspect of the inventive concept, there is provided a method, performed by a primary demander, of provisioning secure information of a secondary demander into a semiconductor device, the method including providing a primary demander identifier to a supplier of the semiconductor device or a component including the semiconductor device, receiving from the supplier a primary key generated based on the primary demander identifier and a device key provisioned into the semiconductor device, receiving a secondary demander identifier from the secondary demander, generating an encryption key based on the primary key and the secondary demander identifier, and providing the encryption key to the secondary demander.

According to another aspect of the inventive concept, there is provided a semiconductor device for provisioning secure information of a demander, including a device key storage configured to store a device key provisioned by a supplier of the semiconductor device, a master key generator configured to generate a master key of the demander based on the device key and demander data provisioned by the demander, a master key manager configured to encrypt the master key and decrypt an encrypted master key by using a physically unclonable function (PUF) key generated based on PUF bits, and a cryptographic engine configured to perform a cryptographic operation based on a decrypted master key provided by the master key manager.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

It is noted that aspects of the inventive concept described with respect to one embodiment, may be incorporated in a different embodiment although not specifically described relative thereto. That is, all embodiments and/or features of any embodiment can be combined in any way and/or combination. These and other objects and/or aspects of the present inventive concept are explained in detail in the specification set forth below. As used herein, the term "and/or" includes any and all combinations of one or more of the associated listed items. Expressions such as "at least one of," when preceding a list of elements, modify the entire list of elements and do not modify the individual elements of the list.

The inventive concept relates to security, and more particularly, to a device and method of provisioning secure information. Hereinafter, embodiments of the inventive concept are described in detail with reference to the accompanying drawings.

Figure 1:
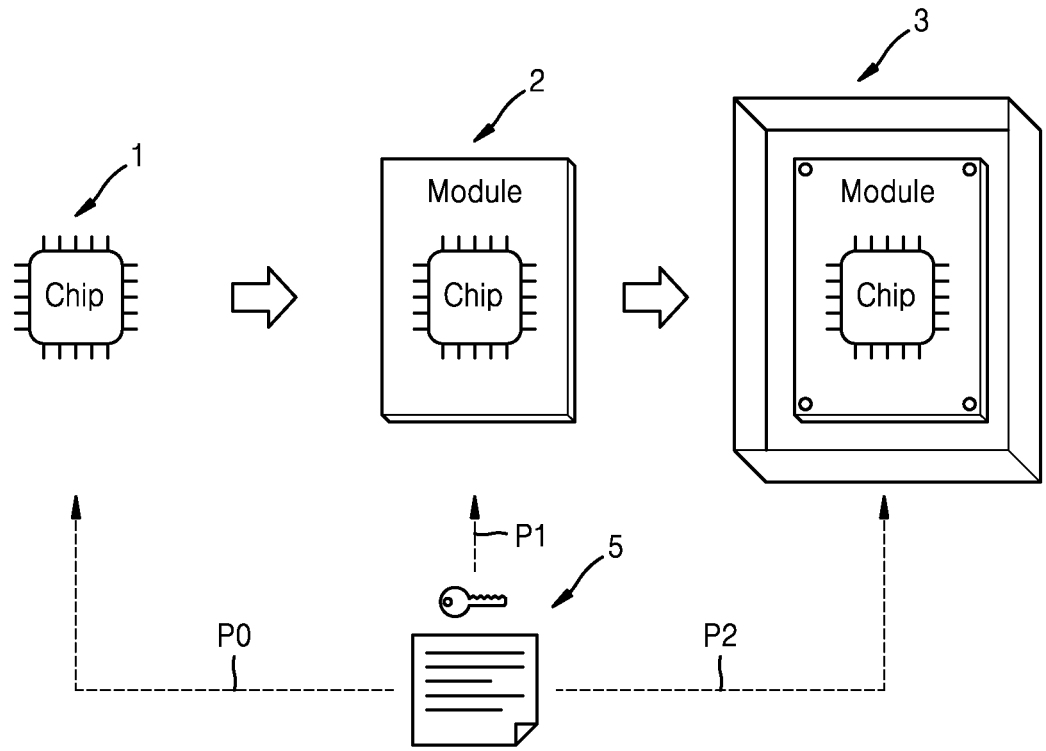
FIG. 1 schematically illustrates examples in which secure information of a chip demander is provisioned into a chip, according to some embodiments of the present inventive concept.

FIG. 1 schematically illustrates examples in which secure information 5 of a demander of a chip 1 is provisioned into the chip 1. As shown in FIG. 1, the chip 1 may be incorporated in a module 2, and the module 2 may be included in a product 3. The chip 1, the module 2, and the product 3 may be respectively manufactured by different manufacturers. Manufacturers of the module 2 and the product 3 may be referred to as demanders of the chip 1. In particular, a manufacturer of the module 2 as a demander receiving the chip 1 from a manufacturer of the chip 1 may be referred to as a primary demander, and a manufacturer of the product 3 as a demander receiving a component including the chip 1, i.e., the module 2 from the primary demander, may be referred to as a secondary demander.

The chip 1 may be manufactured using a semiconductor process and store the secure information 5 therein. For example, the chip 1 may include a non-volatile memory device for storing secure information. Non-limiting examples of the chip 1 may include Electrically Erasable Programmable Read-Only Memory (EEPROM), a flash memory, Phase Change Random Access Memory (PRAM), resistance RAM (RRAM), a Nano Floating Gate Memory (NFGM), polymer RAM (PoRAM), magnetic RAM (MRAM), ferroelectric RAM (FRAM), and a fuse array.

The module 2 may be a component included in the product 3 and include the chip 1. The manufacturer of the module 2 may produce the module 2 that performs a specific function by using the chip 1 and other materials and may supply the module 2 to the manufacturer of the product 3. For example, the module 2 may provide a communication interface to the product 3 based on the secure information 5 inserted into the chip 1. As non-limiting examples, the module 2 may be connected to a mobile telecommunication system such as a Fifth Generation (5G) system, a Long Term Evolution (LTE) system, a Code Division Multiple Access (CDMA) system, a Global System for Mobile Communications (GSM) system, and/or a communication network such as a wide area network (WAN), a local area network (LAN), or a wireless LAN (WLAN), and/or the Internet of Things (IoT).

The product 3 may include the module 2 as a component thereof and provide useful functions associated with the secure information 5 in the chip 1. Non-limiting examples of the product 3 may include an independent computing device such as a personal computer (PC), a network server, a tablet PC, an e-reader, a personal digital assistant (PDA), a portable multimedia player (PMP), a mobile phone, a smart phone, and/or a wearable device and an arbitrary object that provides a specific function, such as an automobile, a mechanical device, a production facility, a door, and/or a lighting.

The secure information 5 may refer to any information that is owned by the manufacturer of the module 2 or the product 3 and is required to be kept confidential away from a party other than the owner of the secure information 5. For example, the secure information 5 may include information used for authentication of the module 2, such as an identifier (ID) of the module 2, manufacturer information of the module 2, a certificate, a private key, a pre-shared key (PSK), etc. Similarly, the secure information 5 may include information used for authentication of the product 3, such as an ID of the product 3, manufacturer information of the product 3, a private key, a PSK, etc. Keys held by a demander of the chip 1, such as a private key and a PSK, may be referred to as a master key or a client master key. As non-limiting examples, a master key in the secure information 5 may be used for operations for authentication of the module 2 and/or the product 3, including remote manipulation of the module 2 and/or the product 3, software upgrades, etc. When the manufacturer of the module 2 provides these operations, the secure information 5 held by the manufacturer of the module 2 may be provisioned into the chip 1. When the manufacturer of the product 3 provides these operations, the secure information 5 held by the manufacturer of the product 3 may be provisioned into the chip 1. In the specification, the chip 1 may be referred to as a semiconductor device, and a master key will mainly be described as an example of the secure information 5 being provisioned into the semiconductor device.

As indicated by a dashed line in FIG. 1, the secure information 5 may be provisioned during manufacture of the chip 1 (P0), manufacture of the module 2 (P1), and/or manufacture of the product 3 (P2). As will be described below with reference to FIGS. 2A through 2C, various problems may occur according to a method of provisioning the secure information 5, but a device and method according to example embodiments described herein may solve these problems and thus facilitate secure provisioning of the secure information 5 into the chip 1.

Figure 2A:
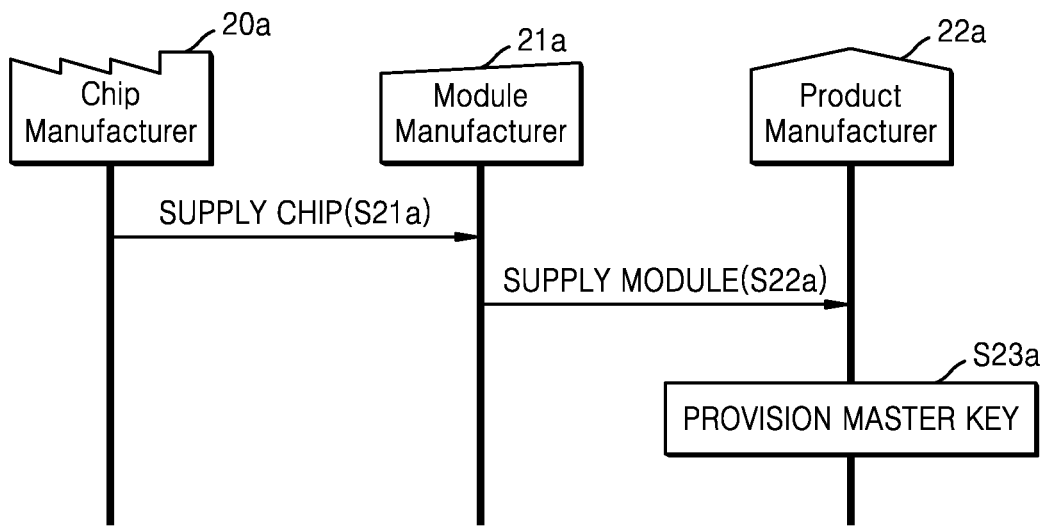
FIGS. 2A through 2C illustrate examples in which secure information is provisioned into the chip of FIG. 1, according to some embodiments of the present inventive concept.
Figure 2B:
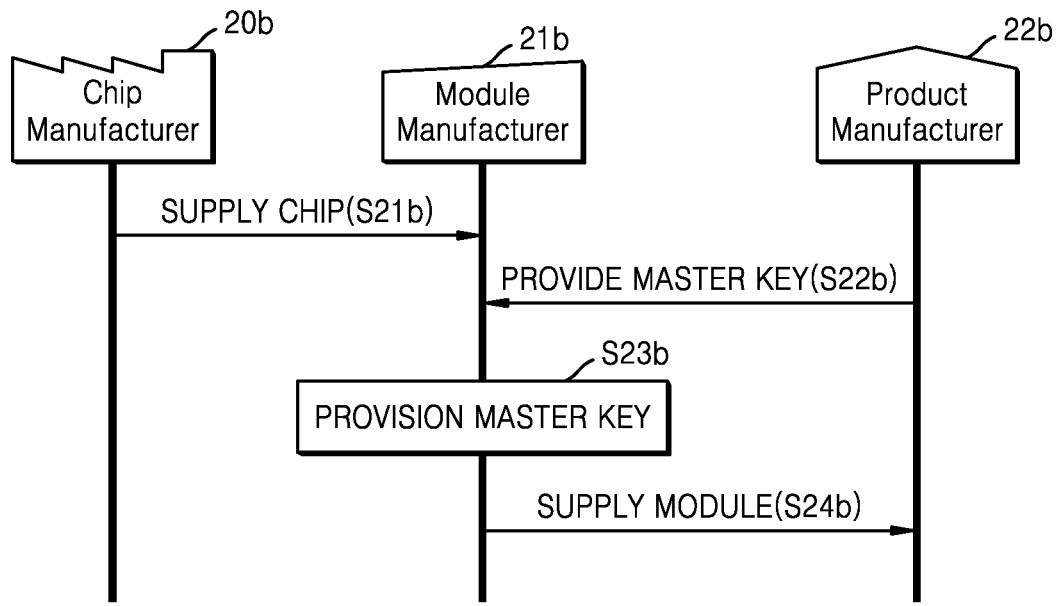
Figure 2C:
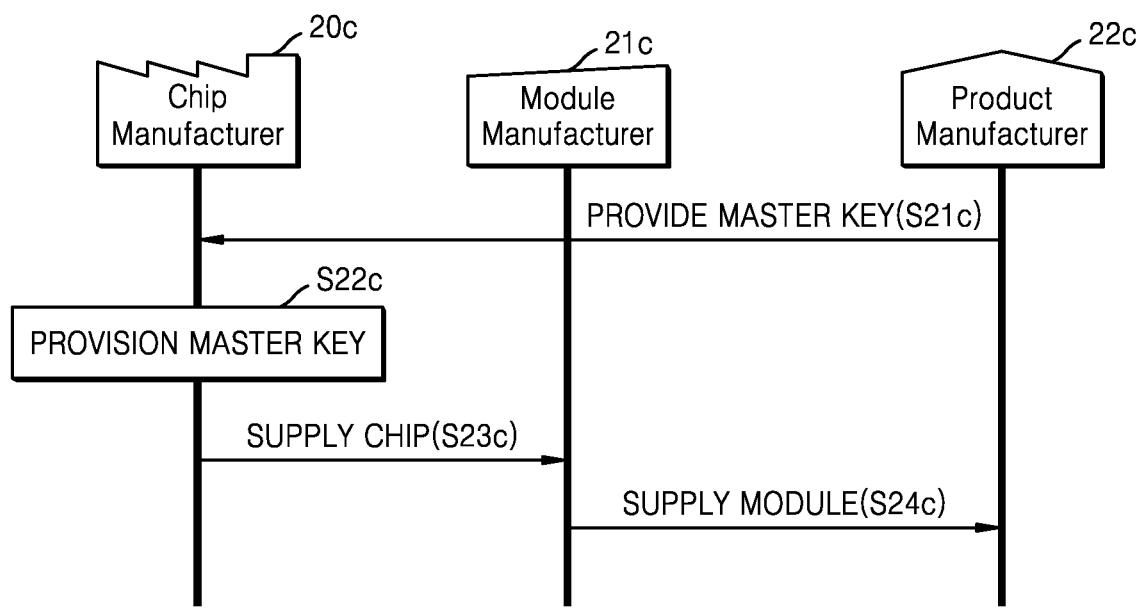

FIGS. 2A through 2C illustrate examples in which the secure information 5 is provisioned into the chip 1 of FIG. 1. In detail, FIGS. 2A through 2C are examples in which master keys of product manufacturers 22a, 22b, and 22c are respectively provisioned as the secure information 5. The examples shown in FIGS. 2A through 2C will now be described in detail with reference to FIG. 1, and descriptions that are already provided above with respect to FIG. 1 may be omitted hereafter.

Referring to FIG. 2A, a master key may be provisioned into the chip 1 by the product manufacturer 22a via the module 2 included in the product 3. First, a chip manufacturer 20a may supply the chip 1 to a module manufacturer 21a (S21a). The chip 1 provided to the module manufacturer 21a may not be provisioned with a master key as of yet, but may include an interface for provisioning the master key. The module manufacturer 21a may supply the module 2 including the chip 1 to the product manufacturer 22a (S22a). The chip 1 included in the module 2 may not still be provisioned with a master key, and the module 2 may include an additional interface via which the product manufacturer 22a is able to access the interface for provisioning the master key. The product manufacturer 22a may provision its own master key into the chip via the interfaces respectively included in the module 2 and the chip 1 (S23a).

According to the example of FIG. 2A, the product manufacturer 22a may provision its own master key directly into the chip 1 without leaking it outside. However, in this case, the product manufacturer 22a not only necessarily needs to have a system for provisioning a master key but also may suffer deterioration of the yield of the product 3 due to the step of provisioning the master key into the chip 1 during manufacture of the product 3. Furthermore, when interfaces for provisioning a master key are designed to be easy to use for convenience of the product manufacturer 22a, the master key may also easily be leaked via the interfaces.

Referring to FIG. 2B, a master key may be provisioned into the chip 1 by a module manufacturer 21b. First, a chip manufacturer 20b may supply the chip 1 to the module manufacturer 21b (S21b). The chip 1 provided to the module manufacturer 21b may not be provisioned with a master key as of yet, and may include an interface for provisioning the master key. The product manufacturer 22b may provide its own master key to the module manufacturer 21b (S22b). Operations S21b and S22b may be performed in a different order than shown in FIG. 2B. The module manufacturer 21b may provision the master key of the product manufacturer 22b into the chip 1 via an interface included in the chip 1 (S23b). Then, the module manufacturer 21b may supply the product manufacturer 22b with the module 2 including the chip 1 into which the master key has been provisioned (S24b).

According to the example of FIG. 2B, since the product manufacturer 22b is supplied with the module 2 including the chip 1 provisioned with its own master key, the yield of the product 3 may be increased. However, since the master key of the product manufacturer 22b must inevitably be provided externally, it may be difficult to prevent the module manufacturer 21b from manufacturing more than a predetermined number of modules 2, each module 2 including the chip 1 provisioned with the master key, as well as leakage of the master key by external parties such as the module manufacturer 21b. Furthermore, similar to the example of FIG. 2A, it may be easy to leak the master key via an interface for providing the master key that was included in the chip 1.

In the examples of FIGS. 2A and 2B, when an entity that generates a master key is separate from an entity that produces module 2 or product 3, the master key may inevitably be exposed to outsides. For example, in the example of FIG. 2A, the product manufacturer 22a may include a developer of the product 3 that generates the master key and a contract manufacturer thereof. The developer of the product 3 may provide the master key to the contract manufacturer for provisioning of the master key, and accordingly the same problems as described with respect to the example of FIG. 2B may be caused by the contract manufacturer of the product 3.

Referring to FIG. 2C, a master key may be provisioned into the chip 1 by a chip manufacturer 20c. First, the product manufacturer 22c may provide its own master key to the chip manufacturer 20c (S21c). When a module manufacturer 21c desires to provision its own master key into the chip 1, unlike in the example of FIG. 2C, the module manufacturer 21c may provide its own master key to the chip manufacturer 20c. The chip manufacturer 20c may provision the master key into the chip 1 (S22c). The master key may be provisioned during manufacture of the chip 1 and accordingly, an interface for provisioning the master key as described with respect to the examples of FIGS. 2A and 2B may be removed from the chip 1 and/or not included in chip 1 during manufacture of chip 1. The chip manufacturer 20c may supply the chip 1 into which the master key has been provisioned to the module manufacturer 21c (S23c), and then the module manufacturer 21c may supply the module 2 including the chip 1 to the product manufacturer 22c (S24c).

According to the example of FIG. 2C, removal of the provisioning interface from the chip 1 may not facilitate leakage of the master key via the chip 1. However, since the master key of the product manufacturer 22c inevitably needs to be provided to the outside as in the example of FIG. 2B, problems associated therewith may occur. Furthermore, the chip manufacturer 20c may manufacture chips by using different methods according to various product manufacturers. In this case, since it is not possible to supply a chip into which a master key of a specific product manufacturer has been provisioned to another product manufacturer, the productivity or production ability of the manufacturer of chip 1 may be deteriorated.

As described above with reference to FIGS. 2A through 2C, various conditions may need to be met when provisioning the master key. In detail, a master key may need to be securely kept in chip 1 so as not to be leaked to an attacker, and the master key may need to be provisioned into chip 1 without being exposed to a contract manufacturer of the product 3 or the module 2. Furthermore, a chip manufacturer may need to be able to supply the already manufactured chip 1 to a demander, i.e., a module manufacturer, without limitation. Similarly, the module manufacturer also may need to be able to supply the already manufactured module 2 to a product manufacturer without limitation, regardless of the chip 1 supplied by the chip manufacturer. As will be described below with reference to the figures, devices and methods according to example embodiments may satisfy the above-described requirements. In the drawings set forth below, an entity such as a device supplier or demander may refer to a manufacturing system operated by the entity or a computing system such as a PC, a server, etc., as a part of the manufacturing system. At least some of the operations performed by the entity may be performed by the manufacturing system and/or the computing system.

Figure 3:
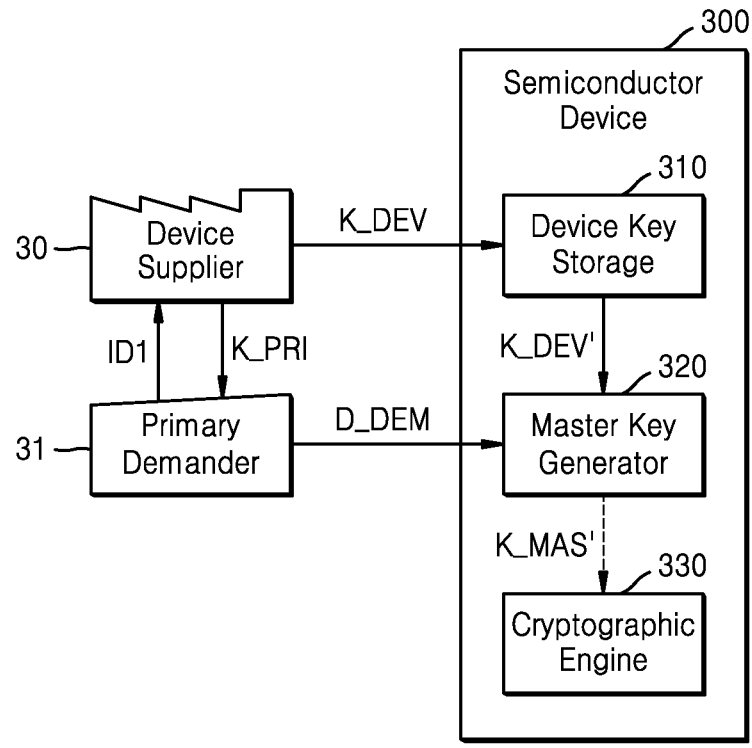
FIG. 3 is a block diagram illustrating a semiconductor device according to an embodiment, according to some embodiments of the present inventive concept.

FIG. 3 is a block diagram illustrating a semiconductor device 300 according to example embodiments. In detail, FIG. 3 illustrates the semiconductor device 300 corresponding to chip 1 of FIG. 1 and entities, i.e., a device supplier 30 and a primary demander 31, outside the semiconductor device 300. Referring to FIG. 3, the semiconductor device 300 may include a device key storage 310, a master key generator 320, and a cryptographic engine 330. Each of the components included in the semiconductor device 300 may include hardware and may be referred to as logic. Each component may include software or a combination of hardware and software and may be referred to as a processing unit or a processor.

The device key storage 310 may receive a device key K_DEV from the device supplier 30 and store the received device key K_DEV. The device key storage 310 may include a non-volatile memory device. According to some embodiments, the device key storage 310 may include a one time programmable (OTP) memory device such as a fuse array. The device supplier 30 may refer to an entity that manufactures the semiconductor device 300 and provision the device key K_DEV into the semiconductor device 300 during the manufacture. Thus, the semiconductor device 300 provisioned with the device key K_DEV, i.e., including the device key storage 310 that stores the device key K_DEV, may be produced.

The master key generator 320 may respectively receive a device key K_DEV' and demander data D_DEM from the device key storage 310 and the primary demander 31 and generate a master key K_MAS' based on the device key K_DEV' and the demander data D_DEM. The primary demander 31, as a demander of the semiconductor device 300, may refer to an entity that receives the semiconductor device 300 from the device supplier 30 and correspond to the module manufacturer 21a, 21b, or 21c shown in FIG. 2A, 2B, or 2C. The demander data D_DEM that the master key generator 320 receives from the primary demander 31 may include data processed when the primary demander 31 communicates with the device supplier 30. For example, as shown in FIG. 3, the primary demander 31 may provide a primary demander ID ID1 as its own ID to the device supplier 30. The device supplier 30 may generate, in response, a primary key K_PRI based on the device key K_DEV and the primary demander ID ID1 and provide the primary key K_PRI to the primary demander 31. The primary demander 31 may generate demander data D_DEM based on the primary key K_PRI and provide the demander data D_DEM into the semiconductor device 300. An example of communication between the device supplier 30 and the primary demander 31 will be described in detail below with reference to FIG. 5. The master key generator 320 may generate the master key K_MAS' in response to provisioning of the demander data D_DEM. In some embodiments, the master key generator 320 may perform an operation of generating the master key K_MAS' once, in order to save processing time and resources by the primary demander 31 and/or master key generator 320 as well as prevent the master key K_MAS' generating operation from being leaked to an attacker. Once generated, the master key K_MAS' may be used by the cryptographic engine 330 as necessary. For example, after generating the master key K_MAS', the master key generator 320 may be fused so as not to generate the master key K_MAS' again. An example of the master key generator 320 will be described in more detail below with reference to FIG. 4.

The cryptographic engine 330 may perform cryptographic operations based on the master key K_MAS'. The cryptographic engine 330 may refer to any hardware, software, or a combination thereof that performs cryptographic operations in order to perform necessary operations. For example, the cryptographic engine 330 may perform encryption/decryption operations by using the master key K_MAS', perform authentication of the other party or request authentication of the semiconductor device 300 based on the master key K_MAS', and/or verify data received from outside the semiconductor device 300 based on the master key K_MAS'. In some embodiments, the cryptographic engine 330 may directly receive the master key K_MAS' generated by the master key generator 320. In some embodiments, the cryptographic engine 330 may read the master key K_MAS' from a master key generator 320 in which the master key K_MAS' is stored. In some embodiments, as will be described in detail below with reference to FIG. 11, the cryptographic engine 330 may receive the master key K_MAS' by requesting the master key K_MAS' from another component of the semiconductor device 300.

Figure 4:
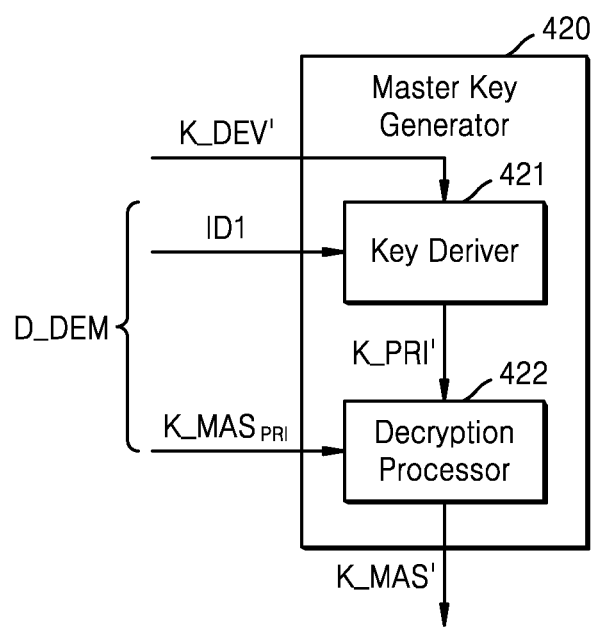
FIG. 4 is a block diagram illustrating an example of a master key generator of FIG. 3, according to some embodiments of the present inventive concept.

FIG. 4 is a block diagram illustrating an example of the master key generator 320 of FIG. 3, according to an example embodiment. As described above with reference to FIG. 3, a master key generator 420 of FIG. 4 may receive a device key K_DEV' from the device key storage 310 and demander data D_DEM from the primary demander 31 outside of the semiconductor device 300. Referring to FIG. 4, the master key generator 420 may include a key deriver 421 and a decryption processor 422, and the demander data D_DEM may include a primary demander ID ID1 and an encrypted master key $K\_MAS_{PRI}$ associated with the primary demander 31. The example of FIG. 4 will now be described in more detail with reference to FIG. 3.

The key deriver 421 may receive the device key K_DEV' and the primary demander ID ID1 included in the demander data D_DEM and generate a primary key K_PRI' based on the device key K_DEV' and the primary demander ID ID1. The key deriver 421 may generate the primary key K_PRI' in a similar manner in which the device supplier 30 of FIG. 3 generates the primary key K_PRI based on the device key K_DEV and the primary demander identifier ID1. In some embodiments, the device supplier 30 may generate the primary key K_PRI by using a key derivation function (KDF). For example, the device key K_DEV may be concatenated with the primary demander ID ID1 and a result of concatenation may be fed into a KDF to generate the primary key K_PRI as output of the KDF. The key deriver 421 may use the same KDF as that used by the device supplier 30 to generate the primary key K_PRI' based on the device key K_DEV' and the primary demander ID ID1. Accordingly, the primary key K_PRI provided to the primary demander 31 by the device supplier 30 may be identical to the primary key K_PRI' generated by the key deriver 421.

The decryption processor 422 may receive the primary key K_PRI' and the encrypted master key $K\_MAS_{PRI}$ included in the demander data D_DEM and generate a master key K_MAS' by decrypting the encrypted master key $K\_MAS_{PRI}$ with the primary key K_PRI'. The primary demander 31 of FIG. 3 may generate an encrypted master key K_MAS$_{PRI}$ by encrypting its master key K_MAS with the primary key K_PRI and provision the encrypted master key K_MAS$_{PRI}$ into the semiconductor device 300. The decryption processor 422 may generate the master key K_MAS' by using a decryption method corresponding to a similar or complementary method by which the primary demander 31 generates the encrypted master key K_MAS$_{PRI}$, i.e., the encryption method performed by the primary demander 31. Since the primary key K_PRI' generated by the key deriver 421 is the same as the primary key K_PRI used by the primary demander 31, the master key K_MAS' may be identical to the master key K_MAS of the primary demander 31.

Figure 5:
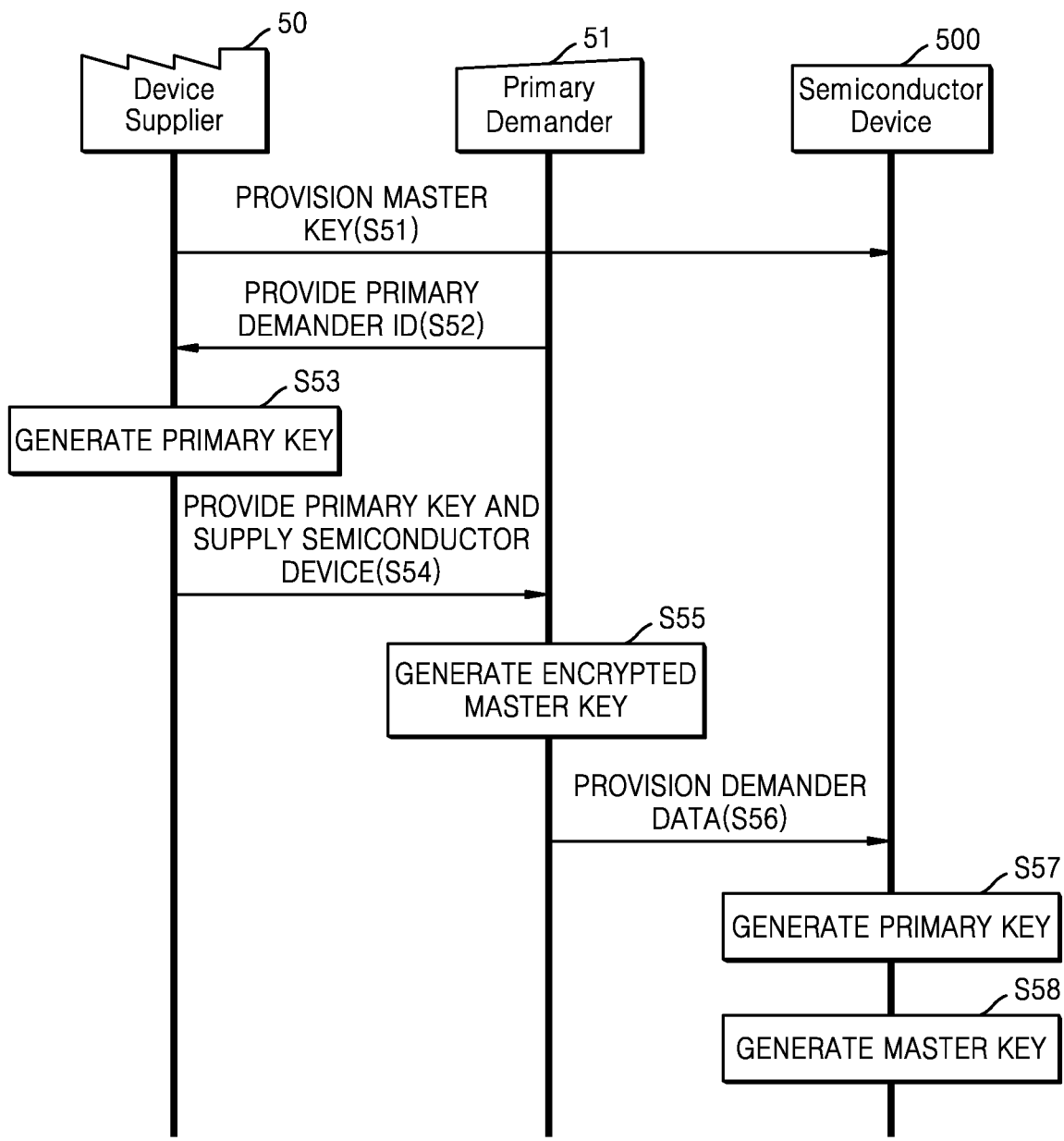
FIG. 5 is a diagram sequentially showing a method of provisioning secure information into a semiconductor device, according to some embodiments of the present inventive concept.

FIG. 5 is a diagram sequentially showing a method of provisioning secure information into a semiconductor device 500, according to example embodiments. In detail, FIG. 5 illustrates a method of provisioning a master key K_MAS of a primary demander 51 as secure information into the semiconductor device 500 corresponding to the semiconductor device 300 of FIG. 3. It is hereinafter assumed that the semiconductor device 500 of FIG. 5 includes at least some of the components of the semiconductor device 300 of FIG. 3, and the method of FIG. 5 will now be described in more detail with reference to FIGS. 3 and 4.

Referring to FIG. 5, a device supplier 50 may provision a device key K_DEV into the semiconductor device 500 (S51). In some embodiments, the device supplier 50 may provision the device key K_DEV into the semiconductor device 500 in a way that is not known to the other entities. For example, the device supplier 50 may program the device key K_DEV into mask ROM corresponding to the device key storage 310 of FIG. 3. The mask ROM may be designed to be inaccessible from outside the semiconductor device 500. The device key K_DEV may be generated and managed by the device supplier 50, and in particular, may be generated independently of a demander of the semiconductor device 500, e.g., a primary demander 51. Thus, the device supplier 50 may manufacture the semiconductor device 500 without limitation to demanders of the semiconductor device 500, and thus, the productivity of the semiconductor device 500 may be improved.

The primary demander 51 may provide a primary demander ID ID1 to the device supplier 50 (S52). The primary demander ID ID1 may refer to unique information that may be used to identify the primary demander 51. For example, the primary demander 51 may generate the primary demander ID ID1 according to a format provided by the device supplier 50. The primary demander ID ID1 may be provided from the primary demander 51 to the device supplier 50 in various ways. For example, the primary demander ID ID1 may be transferred via a network from a server operated by the primary demander 51 to a server operated by the device supplier 50. As will be described below, the primary demander ID ID1 may be independent of a master key K_MAS of the primary demander 51 and may not adversely affect the security of the master key K_MAS even when the primary demander ID ID1 is known to the device supplier 50.

The device supplier 50 may generate a primary key K_PRI (S53). The device supplier 50 may generate the primary key K_PRI based on the device key K_DEV provisioned into the semiconductor device 500 and the primary demander ID ID1 provided from the primary demander 51. As described above with reference to FIG. 4, in some embodiments, the device supplier 50 may generate the primary key K_PRI by using a KDF, which may be the same as or similar to a KDF used when the semiconductor device 500 generates a primary key K_PRI' in operation S57.

The device supplier 50 may provide the primary key K_PRI to the primary demander 51 and supply the semiconductor device 500 thereto (S54). In some embodiments, after the device key K_DEV has been provisioned into the semiconductor device 500 in operation S51, the semiconductor device 500 may be supplied to the primary demander 51 at a time point before demander data D_DEM is provisioned in operation S56. The primary demander 51 may receive the semiconductor device 500 provisioned with the device key K_DEV from the device supplier 50.

The primary demander 51 may generate an encrypted master key K_MAS$_{PRI}$ by using the primary key K_PRI (S55). As non-limiting examples, the primary demander 51 may encrypt the master key K_MAS with the primary key K_PRI as an encryption key by using any encryption technique such as symmetric key encryption, asymmetric key encryption, etc. A key used to encrypt the master key K_MAS to be provisioned may be referred to as an encryption key. In some embodiments, the encryption key may be the primary key K_PRI as in the example of FIG. 5 or a secondary key K_SEC as will be described below with reference to FIG. 6.

The primary demander 51 may provision demander data D_DEM into the semiconductor device 500 (S56). As described above with reference to FIG. 4, the demander data D_DEM may include the primary demander ID ID1 and the encrypted master key K_MAS$_{PRI}$. Even when provisioning of the demander data D_DEM is performed by a contract manufacturer of the primary demander 51, e.g., a contract manufacturer of a component when the primary demander 51 is a manufacturer of the component including the semiconductor device 500, the master key K_MAS may be protected from being leaked due to the encrypted master key K_MAS$_{PRI}$.

The semiconductor device 500 may perform an operation of generating the primary key K_PRI' (S57). For example, the key deriver 421 of FIG. 4 may generate the primary key K_PRI' based on a device key K_DEV' and the primary demander ID ID1 included in the demander data D_DEM. The key deriver 421 may generate the primary key K_PRI' where the device supplier 50 generates the primary key K_PRI in operation S53 e.g., via the same KDF as that used by the device supplier 50. Accordingly, both the primary keys K_PRI and K_PRI' may be identical or similar to each other.

The semiconductor device 500 may perform an operation of generating a master key K_MAS' (S58). For example, the decryption processor 422 of FIG. 4 may generate the master key K_MAS' by decrypting the encrypted master key K_MAS$_{PRI}$ included in the demander data D_DEM with the primary key K_PRI'. The decryption processor 422 may generate the master key K_MAS' by using a decryption method corresponding to the method whereby the primary demander 51 encrypts the master key K_MAS in operation S55. Since the two primary keys K_PRI and K_PRI' are identical to each other, both the master keys K_MAS and K_MAS' may also coincide with each other. Consequently, the master key K_MAS of the primary demander 51 may be provisioned securely into the semiconductor device 500 without being disclosed to the device supplier 50 and/or a possible contract manufacturer of the component and may be restored completely within the semiconductor device 500.

Figure 6:
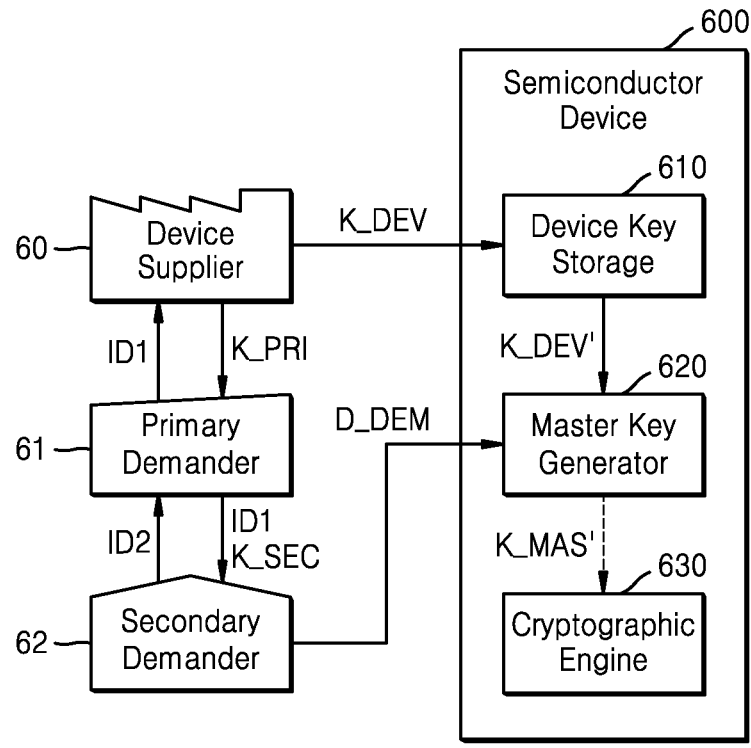
FIG. 6 is a block diagram illustrating a semiconductor device according to some embodiments of the present inventive concept.

FIG. 6 is a block diagram illustrating a semiconductor device 600 according to example embodiments. In detail, FIG. 6 illustrates the semiconductor device 600 corresponding to the chip 1 described with reference to FIG. 1. Unlike the semiconductor device 300 of FIG. 3, the semiconductor device 600 of FIG. 6 may receive demander data D_DEM from a secondary demander 62. Similar to the semiconductor device 300 of FIG. 3, the semiconductor device 600 may include a device key storage 610, a master key generator 620, and a cryptographic engine 630. Descriptions that are already provided above with respect to FIG. 3 may be omitted hereinafter.

When the semiconductor device 600 is supplied to the secondary demander 62 via the primary demander 61, the secondary demander 62 may provision the demander data D_DEM into the semiconductor device 600. The secondary demander 62 may refer to an entity (e.g., the product manufacturer 22a of FIG. 2A) supplied with a component by the primary demander 61 that receives the semiconductor device 600 from the device supplier 60, processes the semiconductor device 600, and manufactures a component (e.g., the module 2 of FIG. 1) including the semiconductor device 600. The device supplier 60 may need to be able to supply the semiconductor device 600 to the primary demander 61 without limitation. Similarly, the primary demander 61 also may need to be able to supply a component including the semiconductor device 600 to the secondary demander 62 without limitation. To achieve this, the primary demander 61 may generate the secondary key K_SEC based on the primary key K_PRI provided by the device supplier 60 and a secondary demander ID ID2 provided by the secondary demander 62. The primary demander may provide the secondary key K_SEC to the secondary demander 62, together with its own primary demander ID ID1. Similar to the primary demander 31 described with reference to FIG. 3, the secondary demander 62 may generate demander data D_DEM based on the secondary key K_SEC and provision the demander data D_DEM into the semiconductor device 600. The secondary key K_SEC of the primary demander 61 may perform the same or similar functions as the primary key K_PRI provided to the primary demander 31 of FIG. 3 by the device supplier 30, and accordingly, provisioning of secure information may be extended in a vertical direction. An example of communication between the primary and secondary demanders 61 and 62 will be described in detail below with reference to FIG. 8.

The device key storage 610 may store a device key K_DEV' provisioned by the device supplier 60 and provide a stored device key K_DEV' to the master key generator 620. The master key generator 620 may generate, in response to provisioning of the demander data D_DEM, a master key K_MAS' based on the device key K_DEV' and the demander data D_DEM. Unlike the master key generator 320 described with reference to FIG. 3, the master key generator 620 of FIG. 6 may generate the secondary key K_SEC' after generating the primary key K_PRI'. An example of the master key generator 620 will be described in more detail below with reference to FIG. 7. The cryptographic engine 630 may perform cryptographic operations based on the master key K_MAS'.

Figure 7:
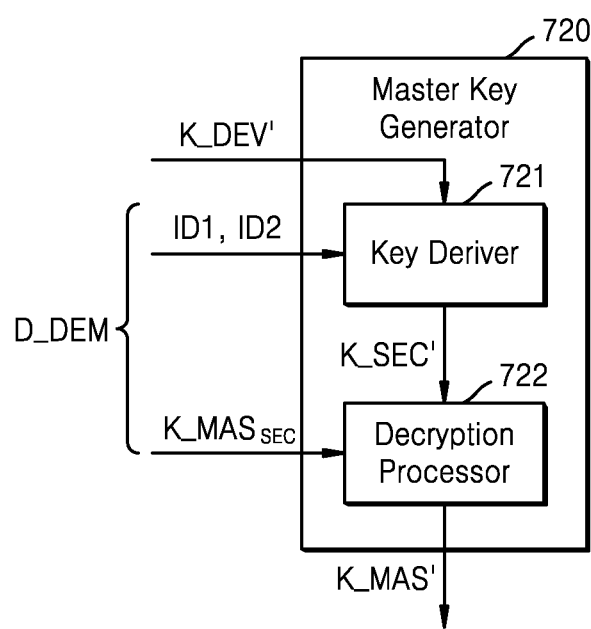
FIG. 7 is a block diagram illustrating an example of a master key generator of FIG. 6, according to some embodiments of the present inventive concept.

FIG. 7 is a block diagram illustrating an example of the master key generator 620 described with reference to FIG. 6, according to example embodiments. As described above with reference to FIG. 6, a master key generator 720 of FIG. 7 may receive the device key K_DEV' from the device key storage 610 and the demander data D_DEM from the secondary demander 62 outside the semiconductor device 600. Referring to FIG. 7, the master key generator 720 may include a key deriver 721 and a decryption processor 722, and the demander data D_DEM may include a primary demander ID ID1, a secondary demander ID ID2, and an encrypted master key K_MAS$_{SEC}$. The example of FIG. 7 will now be described in more detail with reference to FIG. 6, and descriptions that are already provided above with reference to FIG. 4 will be omitted herein.

The key deriver 721 may generate a secondary key K_SEC' based on the device key K_DEV' and the primary demander ID ID1 and the secondary demander ID ID2 included in the demander data D_DEM. In detail, the key deriver 721 may generate a primary key K_PRI' in the same or similar manner in which the device supplier 60 of FIG. 6 generates the primary key K_PRI based on the device key K_DEV and the primary demander ID ID1. Then, the key deriver 721 may generate the secondary key K_SEC' in the same or similar manner in which the primary demander 61 of FIG. 6 generates the secondary key K_SEC based on the primary key K_PRI and the secondary demander ID ID2. In some embodiments, the method whereby the device supplier 60 generates the primary key K_PRI may be the same as or similar to the method whereby the primary demander 61 generates the secondary key K_SEC. For example, the primary key K_PRI and the secondary key K_SEC may be generated using the same KDF. In this case, the key deriver 721 may generate the secondary key K_SEC' by repeating an operation of generating keys via a KDF twice. Consequently, the secondary key K_SEC provided to the secondary demander 62 by the primary demander 61 may be identical to or similar to the secondary key K_SEC' generated by the key deriver 721.

The decryption processor 722 may receive the secondary key K_SEC' and the encrypted master key K_MAS$_{SEC}$ included in the demander data D_DEM and generate a master key K_MAS' by decrypting the encrypted master key K_MAS$_{SEC}$ with the secondary key K_SEC'. The secondary demander 62 of FIG. 6 may generate an encrypted master key K_MAS$_{SEC}$ by encrypting its own master key K_MAS with the secondary key K_SEC provided from the primary demander 61 and provision the encrypted master key K_MAS$_{SEC}$ into the semiconductor device 600. The decryption processor 722 may generate the master key K_MAS' by using a decryption method corresponding to the same or similar method by which the secondary demander 62 generates the encrypted master key K_MAS$_{SEC}$, i.e., the encryption method performed by the secondary demander 62. Since the secondary key K_SEC' generated by the key deriver 721 is identical to the secondary key K_SEC used by the secondary demander 62, the master key K_MAS' may be identical to the master key K_MAS of the secondary demander 62.

Figure 8:
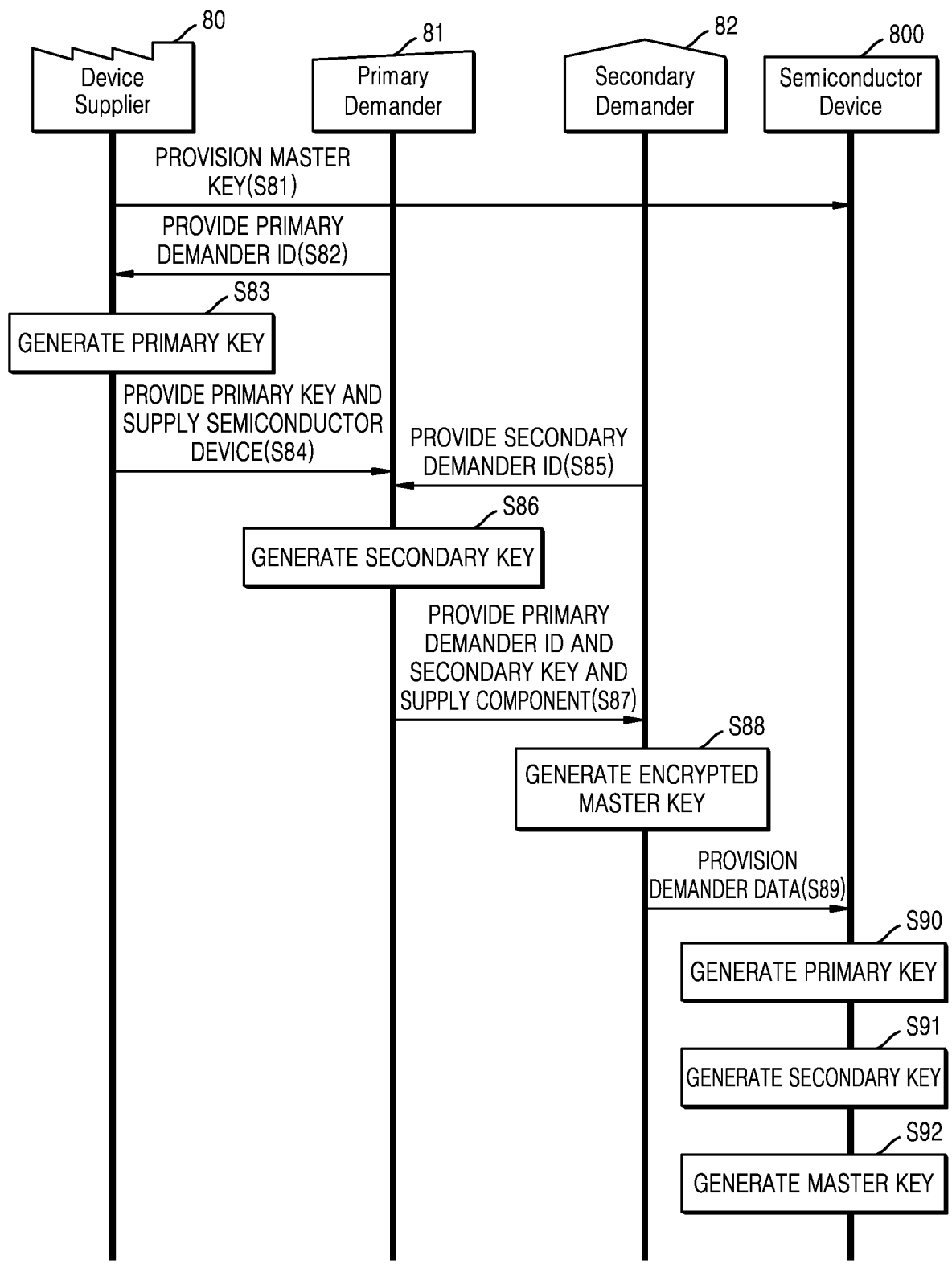
FIG. 8 is a diagram sequentially showing a method of provisioning secure information into a semiconductor device, according to some embodiments of the present inventive concept.

FIG. 8 is a diagram sequentially showing a method of provisioning secure information into a semiconductor device 800, according to example embodiments. In detail, FIG. 8 illustrates a method of provisioning a master key K_MAS of a secondary demander 82 as secure information into the semiconductor device 800 corresponding to the semiconductor device 600 of FIG. 6. It is hereinafter assumed that the semiconductor device 800 of FIG. 8 includes at least some of the components of the semiconductor device 600 of FIG. 6. The method of FIG. 8 will now be described in detail with reference to FIGS. 6 and 7, and descriptions that are already provided above with respect to FIG. 5 may be omitted herein.

Referring to FIG. 8, a device supplier 80 may provision a device key K_DEV into the semiconductor device 800 (S81). A primary demander 81 may provide a primary demander ID ID1 to the device supplier 80 (S82). The device supplier 80 may generate a primary key K_PRI based on the device key K_DEV and the primary demander ID ID1 (S83). The device supplier 80 may provide the primary key K_PRI to the primary demander 81 and supply the semiconductor device 800 provisioned with the device key K_DEV to the primary demander 81 (S84).

The secondary demander 82 may provide a secondary demander ID ID2 to the primary demander 81 (S85). The secondary demander ID ID2 may refer to unique information that may be used to identify the secondary demander 82. For example, the secondary demander 82 may generate the secondary demander ID ID2 according to a format provided by the device supplier 80 and/or the primary demander 81. Similar to the case wherein the primary demander 81 provides the primary demander ID ID1 to the device supplier 80, the secondary demander ID ID2 may be provided from the secondary demander 82 to the primary demander 81 in various ways. For example, the secondary demander ID ID2 may be transferred via a network from a server operated by the secondary demander 82 to a server operated by the primary demander 81. As will be described below, the secondary demander ID ID2 may be independent of a master key K_MAS of the secondary demander 82 and may not adversely affect the security of the master key K_MAS even when the secondary demander ID ID2 is known to the primary demander 81.

The primary demander 81 may generate a secondary key K_SEC (S86). The primary demander 81 may generate the secondary key K_SEC based on the primary key K_PRI provided by the device supplier 80 and the secondary demander ID ID2 provided by the secondary demander 82. As described above with reference to FIG. 7, in some embodiments, the primary demander 81 may generate the secondary key K_SEC by using a KDF, which may be the same as or similar to a KDF used when the semiconductor device 800 generates a secondary key K_SEC' in operation S91. Furthermore, in some embodiments, keys may be respectively generated using the same KDF in operations S83, S86, S90, and S91.

The primary demander 81 may provide the primary demander ID ID1 and the secondary key K_SEC to the secondary demander 82 and supply a component including the semiconductor device 800 thereto (S87). In some embodiments, after the semiconductor device 800 has been supplied to the primary demander 81 in operation S84, the component including the semiconductor device 800 may be supplied to the secondary demander 82 at a time point before the demander data D_DEM is provisioned into the semiconductor device 800 in operation S89. The secondary demander 82 may receive the semiconductor device 800 provisioned with the device key K_DEV from the primary demander 81. As will be described below, the secondary key K_SEC provided by the primary demander 81 may be used to encrypt the master key K_MAS in the secondary demander 82 and the semiconductor device 800 by performing the same or similar function as the primary key K_PRI provided by the device supplier 50 of FIG. 5.

The secondary demander 82 may generate an encrypted master key K_MAS$_{SEC}$ by using the secondary key K_SEC (S88). The secondary demander 82 may encrypt the master key K_MAS with the secondary key K_SEC as an encryption key by using any encryption technique.

The secondary demander 82 may provision the demander data D_DEM into the semiconductor device 800 (S89). As described above with reference to FIG. 7, the demander data D_DEM may include the primary demander ID ID1, the secondary demander ID ID2, and the encrypted master key K_MAS$_{SEC}$. Even when provisioning of the demander data D_DEM is performed by a contract manufacturer of the secondary demander 82, e.g., a contract manufacturer of a product when the secondary demander 82 is a manufacturer of the product including a component, the master key K_MAS may be protected from being leaked due to the encrypted master key K_MAS$_{SEC}$.

The semiconductor device 800 may perform an operation of generating a primary key K_PRI'. (S90). For example, the key deriver 721 of FIG. 7 may generate the primary key K_PRI' based on a device key K_DEV' and the primary demander ID ID1 included in the demander data D_DEM by using the method whereby the device supplier 80, generates the primary key K_PRI in operation S83. Accordingly, both the primary keys K_PRI and K_PRI' may be identical to each other.

The semiconductor device 800 may perform an operation of generating the secondary key K_SEC' (S91). For example, the key deriver 721 of FIG. 7 may generate the secondary key K_SEC' by using the method whereby the primary demander 81 generates the secondary key K_SEC in operation S86. Thus, both the secondary keys K_SEC and K_SEC' may be identical to each other.

The semiconductor device 800 may perform an operation of generating a master key K_MAS' (S92). For example, the decryption processor 722 of FIG. 7 may generate the master key K_MAS' by decrypting the encrypted master key K_MAS SEC included in the demander data D_DEM with the secondary key K_SEC'. The decryption processor 722 may generate the master key K_MAS' by using a decryption method corresponding to the method whereby the secondary demander 82 encrypts the master key K_MAS in operation S88. Since the two secondary keys K_SEC and K_SEC' are identical to each other, both the master keys K_MAS and K_MAS' may also coincide with each other. Consequently, the master key K_MAS of the secondary demander 82 may be provisioned securely into the semiconductor device 800 without being disclosed to the device supplier 80, the primary demander 81, and/or a possible contract manufacturer of the product and may be restored completely within the semiconductor device 800.

Figure 9:
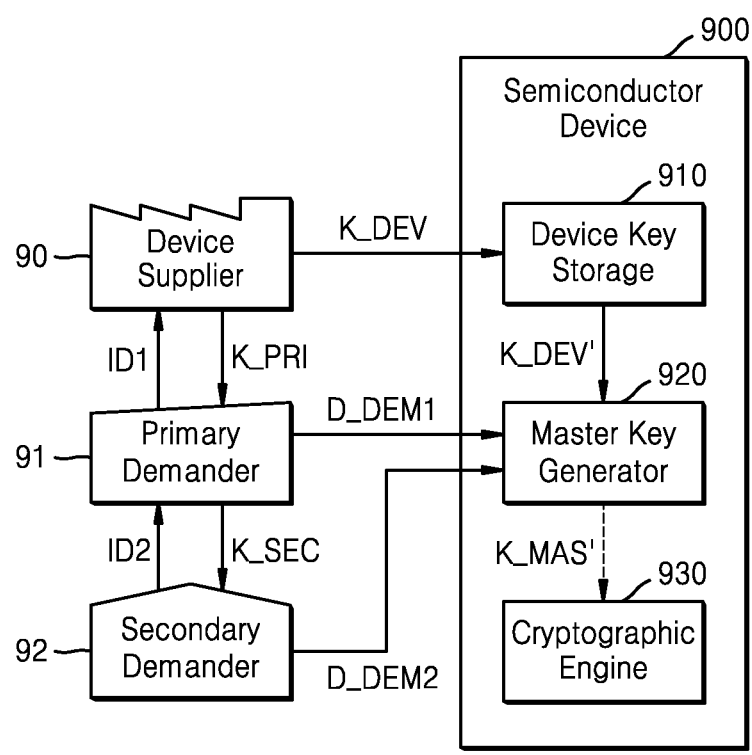
FIG. 9 is a block diagram illustrating a semiconductor device according to some embodiments of the present inventive concept.

FIG. 9 is a block diagram illustrating a semiconductor device 900 according to example embodiments. In detail, FIG. 9 illustrates the semiconductor device 900 corresponding to the chip 1 described with reference to FIG. 1. Unlike the semiconductor device 600 of FIG. 6, the semiconductor device 900 of FIG. 9 may respectively receive primary demander data D_DEM1 and secondary demander data D_DEM2 from a primary demander 91 and a secondary demander 92. Similar to the semiconductor device 600 of FIG. 6, the semiconductor device 900 may include a device key storage 910, a master key generator 920, and a cryptographic engine 930. Descriptions that are already provided above with respect to FIG. 6 may be omitted hereinafter.

According to some embodiments, the primary demander 91 as well as the secondary demander 92 may provision a component of demander data into the semiconductor device 900. For example, as shown in FIG. 9, the primary demander 91 may provide primary demander ID ID1 to the device supplier 90 and receive a primary key K_PRI therefrom. Furthermore, the primary demander 91 may receive secondary demander ID ID2 from the secondary demander 92 and provide a secondary key K_SEC thereto. As described above with reference to FIGS. 6 and 7, the master key generator 920 of the semiconductor device 900 may require the primary demander ID ID1 as well as the secondary demander ID ID2 to generate a master key K_MAS'. In the example embodiment shown in FIG. 9, the primary demander 91 may provision the primary demander data D_DEM1 including the primary demander ID ID1 into the semiconductor device 900. Accordingly, a component including the semiconductor device 900 into which the primary demander ID ID1 has been provisioned may be provided to the secondary demander 92, and the secondary demander 92 may provision the secondary demander data D_DEM2 including the secondary demander ID ID2 and an encrypted master key K_MAS$_{SEC}$ into the semiconductor device 900.

Figure 10:
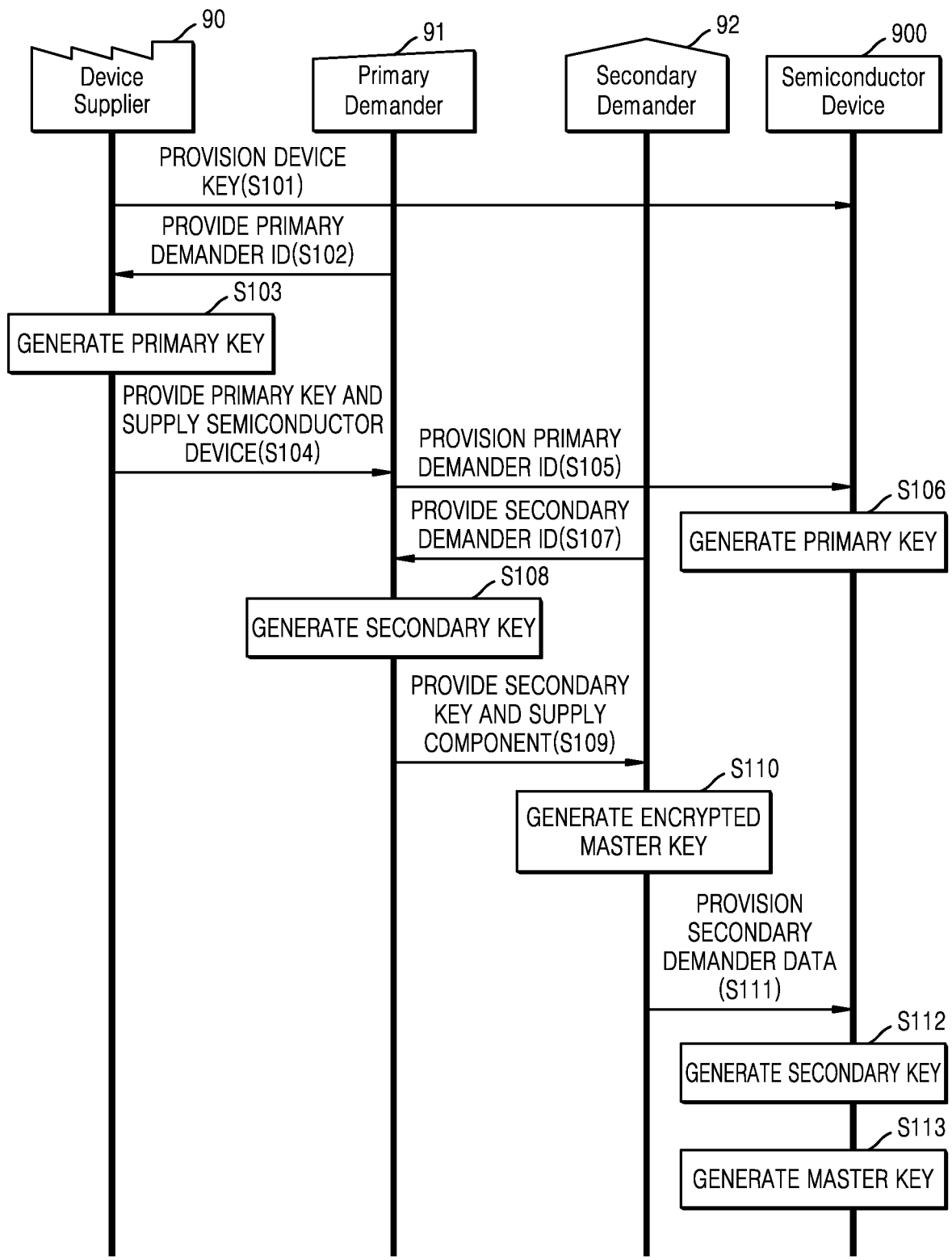
FIG. 10 is a diagram sequentially showing a method of provisioning secure information into a semiconductor device, according to some embodiments of the present inventive concept.

FIG. 10 is a diagram sequentially showing a method of provisioning secure information into the semiconductor device 900 described with reference to FIG. 9, according to example embodiments. In detail, FIG. 10 illustrates a method of provisioning a master key K_MAS of a secondary demander 92 as secure information into the semiconductor device 900. The method of FIG. 10 will now be described in detail with reference to FIG. 9, and descriptions that are already provided above with respect to FIG. 8 may be omitted herein.

Referring to FIG. 10, a device supplier 90 may provision a device key K_DEV into the semiconductor device 900 (S101). A primary demander 91 may provide a primary demander ID ID1 to the device supplier 90 (S102). The device supplier 90 may generate a primary key K_PRI based on the device key K_DEV and the primary demander ID ID1 (S103). The device supplier 90 may provide the primary key K_PRI to the primary demander 91 and supply the semiconductor device 900 into which the device key K_DEV has been provisioned to the primary demander 91 (S104).

The primary demander 91 may provision primary demander data D_DEM1 into the semiconductor device 900 (S105). The primary demander data D_DEM1 may include the primary demander ID ID1, and the primary demander ID ID1 may be independent of the secondary demander ID ID2 and the master key K_MAS of the secondary demander 92. Thus, even when provisioning of the primary demander data D_DEM1 is performed by a contract manufacturer of the primary demander 91 such as a contract manufacturer of a component including the semiconductor device 900, this may not restrict the secondary demander 92 or threaten the security of the master key K_MAS of the secondary demander 92. In some embodiments, after the semiconductor device 900 has been supplied to the primary demander 91 in operation S104, the primary demander data D_DEM1 may be provisioned into the semiconductor device 900 at any time point before the component including the semiconductor device 900 is supplied to the secondary demander 92 in operation S109.

The semiconductor device 900 may perform an operation of generating a primary key K_PRI' (S106). For example, the semiconductor device 900 may include a key deriver similar to the key deriver 721 described with reference to FIG. 7. The key deriver included in the semiconductor device 900 may generate, in response to provisioning of the primary demander data D_DEM1, the primary key K_PRI' based on the primary demander ID ID1 included in the primary demander data D_DEM1 by using the method whereby the device supplier 90 generates the primary key K_PRI in operation S103.

The secondary demander 92 may provide the secondary demander ID ID2 to the primary demander 91 (S107). Then, the primary demander 91 may generate a secondary key K_SEC based on the primary key K_PRI and the secondary demander ID ID2 (S108).

The primary demander 91 may provide the secondary key K_SEC to the secondary demander 92 and supply the component including the semiconductor device 900 thereto (S109). Since the primary demander data D_DEM1 including the primary demander ID ID1 has been provisioned into the semiconductor device 900 in operation S105, unlike in operation S87 described with reference to FIG. 8, the primary demander 91 may not provide the primary demander ID ID1 to the secondary demander 92 in operation S109. In some embodiments, after the primary demander data D_DEM1 has been provisioned into the semiconductor device 900 in operation S105, the component including the semiconductor device 900 may be supplied to the secondary demander 92 at a time before the secondary demander data D_DEM2 is provisioned into the semiconductor device 900 in operation S111. The secondary demander 92 may receive, from the primary demander 91, the component including the semiconductor device 900 to which the device key K_DEV and the primary demander ID ID1 have been provisioned.

The secondary demander 92 may generate an encrypted master key K_MAS$_{SEC}$ by using the secondary key K_SEC (S110). Subsequently, the secondary demander 92 may provision the secondary demander data D_DEM2 into the semiconductor device 900 in operation S111. The secondary demander data D_DEM2 may contain the secondary demander ID ID2 and the encrypted master key K_MAS SEC.

The semiconductor device 900 may perform an operation of generating a secondary key K_SEC' (S112). As described above, the semiconductor device 900 may include a key deriver similar to the key deriver 721 of FIG. 7. The key deriver included in the semiconductor device 900 may generate, in response to provisioning of the secondary demander data D_DEM2, the secondary key K_SEC' based on the primary key K_PRI' generated in operation S106 and the secondary demander ID ID2 included in the secondary demander data D_DEM2 by using the method whereby the primary demander 91 generates the secondary key K_SEC in operation S108. Thereafter, the semiconductor device 900 may perform an operation of generating a master key K_MAS' by using decryption with the secondary key K_SEC' (S113).

Figure 11:
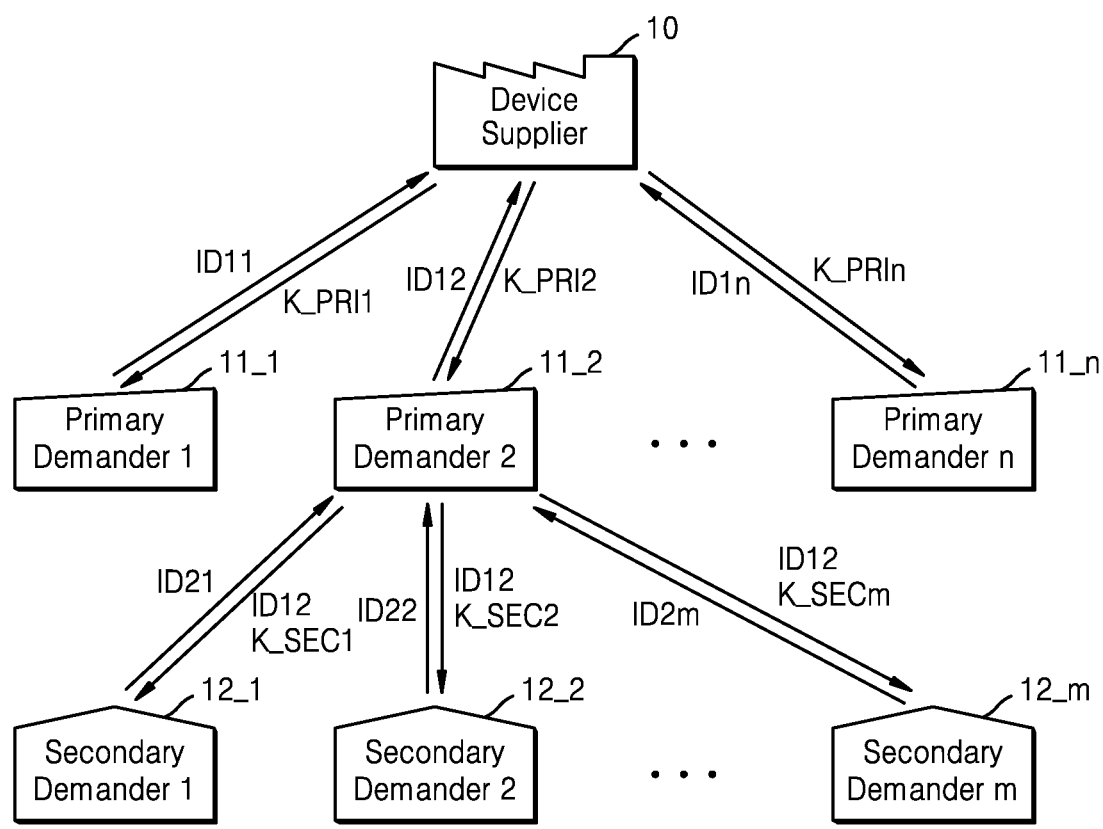
FIG. 11 illustrates entities performing a method of provisioning secure information according to some embodiments of the present inventive concept.

FIG. 11 illustrates entities performing a method of provisioning secure information according to example embodiments. As described above with reference to the figures, a master key of a demander of a semiconductor device, such as a primary or secondary demander, may be provisioned securely into the semiconductor device and may be restored completely in the semiconductor device. As will be described in detail below with reference to FIG. 11, a device and method for provisioning secure information according to example embodiments allow vertical and horizontal extension of entities. The entities will now be described in detail with respect to the semiconductor device 600 of FIG. 6.

A device supplier 10 may manufacture the semiconductor device 600 without limitation to first through n-th primary demanders 11_1 through 11_n, where n is a positive integer. In other words, the device supplier 10 may manufacture the semiconductor device 600 by provisioning a device key K_DEV into the semiconductor device 600 independently of the first through n-th primary demanders 11_1 through 11_n.

For example, the device supplier 10 may generate a first primary key K_PRI11 based on the device key K_DEV and a first primary demander ID ID11 provided by the first primary demander 11_1 and provide the first primary key K_PRI11 to the first primary demander 11_1. Similarly, the device supplier 10 may generate an n-th primary key K_PRIn based on the device key K_DEV and an n-th primary demander ID ID1n provided by the n-th primary demander 11_n and provide the n-th primary key K_PRIn to the n-th primary demander 11_n. In this way, the device supplier 10 may provide the first through n-th primary keys K_PRI11 through K_PRIn independently of one another and accordingly, manufacture the semiconductor device 600 without limitation to the first through n-th primary demanders 11_1 through 11_n. It will be understood that, although the terms first, second, third, etc. may be used herein to describe various elements, elements should not be limited by these terms; rather, these terms are only used to distinguish one element from another element. Thus, a first element discussed below could be termed a second element without departing from the scope of the present inventive concepts Similar to the device supplier 10, each of the first through n-th primary demanders 11_1 through 11_n may receive the semiconductor device 600 from the device supplier 10 and manufacture a component including the semiconductor device 600 without limitation to demanders of the component, i.e., first through m-th secondary demanders 12_1 through 12_m, where m is a positive integer. In other words, each of the first through n-th primary demanders 11_1 through 11_n may receive the semiconductor device 600 from the device supplier 10 independently of the first through m-th secondary demanders 12_1 through 12_m and supply components without limitation to the first through m-th secondary demanders 12_1 through 12_m. For example, the second primary demander 11_2 may generate a first secondary key K_SEC1 based on the second primary key K_PRI2 and a first secondary demander ID ID21 respectively received from the device supplier 10 and the first secondary demander 12_1 and provide the second primary demander ID ID12 and the first secondary key K_SEC1 to the first secondary demander 12_1. Furthermore, the second primary demander 11_2 may generate a second secondary key K_SEC2 based on the second primary key K_PRI2 and a second secondary demander ID ID22 received from the second secondary demander 12_2 and provide the second primary demander ID ID12 and the second secondary key K_SEC2 to the second secondary demander 12_2. In addition, the second primary demander 11_2 may generate an m-th secondary key K_SECm based on the second primary key K_PRI2 and an m-th secondary demander ID ID2m received from the m-th secondary demander 12_m and provide the second primary demander ID ID12 and the m-th secondary key K_SECm to the m-th secondary demander 12_m. In this way, each of the first through n-th primary demanders 11_1 through 11_n may provide the first through m-th secondary keys K_SEC1 through K_SECm independently of one another and accordingly, manufacture the component including the semiconductor device 600 without limitation to the first through m-th secondary demanders 12_1 through 12_m. Although FIG. 11 shows up to the secondary demanders (e.g., the first through m-th secondary demanders 12_1 through 12_m), it will be understood that there may be additional demanders including tertiary demanders below the first through m-th secondary demanders 12_1 through 12_m and that an upper-level demander is able to communicate with a lower-level demander, similar to the above-described primary and secondary demanders.

Figure 12:
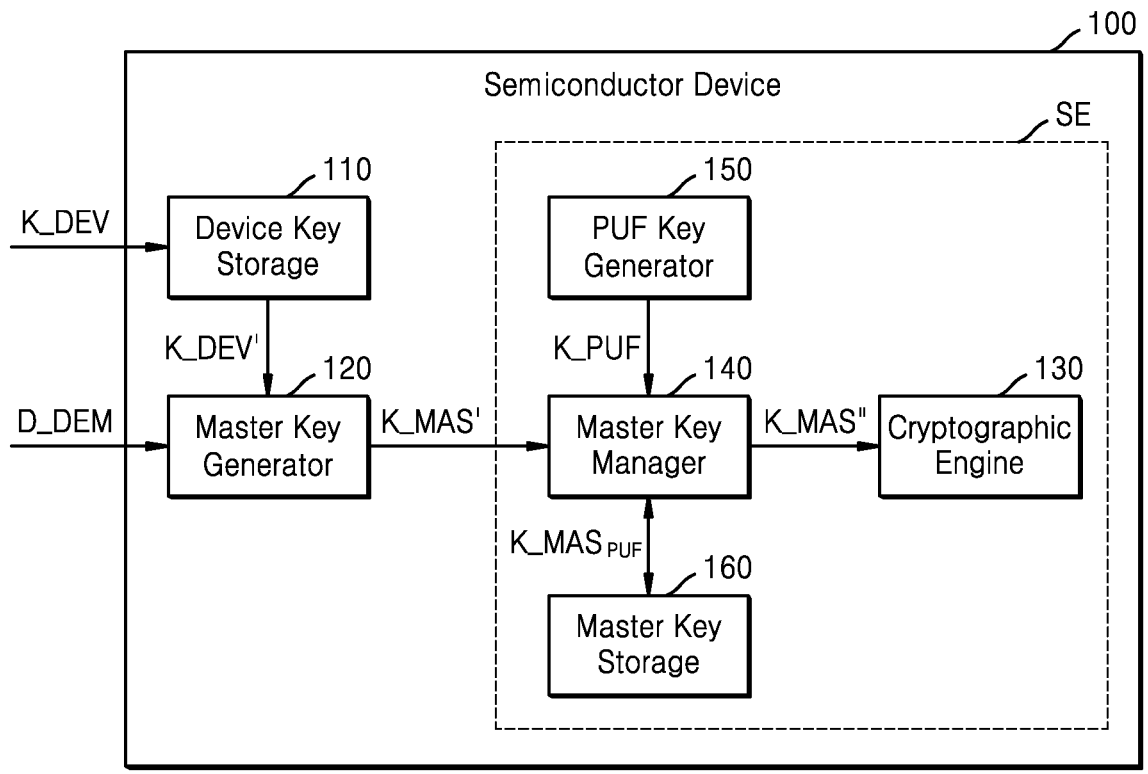
FIG. 12 is a block diagram illustrating a semiconductor device according to some embodiments of the present inventive concept.

FIG. 12 is a block diagram illustrating a semiconductor device 100 according to example embodiments. Unlike the semiconductor device 300 described with reference to FIG. 3, the semiconductor device 100 of FIG. 12 may further include additional components for preventing a master key K_MAS' generated by a master key generator 120 from being leaked outside the semiconductor device 100 or being duplicated. Referring to FIG. 12, the semiconductor device 100 may include a device key storage 110, a master key generator 120, a cryptographic engine 130, a master key manager 140, a physically unclonable function (PUF) key generator 150, and a master key storage 160. Descriptions that are already provided above with respect to FIG. 3 may be omitted herein.

The device key storage 110 may store a device key K_DEV provisioned from outside the semiconductor device 100 and receive a stored device key K_DEV' for storage. The master key generator 120 may receive demander data D_DEM from outside the semiconductor device 100 and generate the master key K_MAS' based on the device key K_DEV' and the demander data D_DEM.

The PUF key generator 150 may generate a PUF key K_PUF based on PUF bits. A PUF may provide a unique value corresponding to hardware based on intrinsic characteristics of the hardware, and PUF bits may have such a unique value. For example, even when a plurality of semiconductor devices including the semiconductor device 100 are manufactured using the same semiconductor process, variations may occur at least partially during the manufacturing process, and PUF bits may be extracted based on the variations. The PUF key generator 150 may generate a PUF key K_PUF that depends on PUF bits. The PUF key K_PUF may not be stored in the semiconductor device 100 but be generated from the PUF bits by the PUF key generator 150 during runtime. Thus, it is possible to prevent the PUF key K_PUF from being leaked outside the semiconductor device 100 or being copied. Furthermore, as will be described below, since the master key K_MAS' is encrypted with the PUF key K_PUF for storage, the master key K_MAS' may also be prevented from being leaked outside the semiconductor device 100 or being copied. In some embodiments, the PUF key generator 150 may generate the PUF key K_PUF in response to a request from the master key manager 140 and provide the PUF key K_PUF to the master key manager 140.

The master key manager 140 may generate an encrypted master key $K\_MAS_{PUF}$ based on the master key K_MAS' received from the master key generator 120 and the PUF key K_PUF received from the PUF key generator 150 and provide the encrypted master key $K\_MAS_{PUF}$ to the master key storage 160 for storage. Furthermore, the master key manager 140 may generate a master key K_MAS" based on the encrypted master key $K\_MAS_{PUF}$ stored in the master key storage 160 and the PUF key K_PUF received from the PUF key generator 150 and provide the master key K_MAS" to the cryptographic engine 130. The master key storage 160 may store the encrypted master key $K\_MAS_{PUF}$. In some embodiments, the master key storage 160 may include a non-volatile memory device such as an OTP memory device. Examples of the master key manager 140 and the master key storage 160 will be described in detail below with reference to FIG. 13.

In some embodiments, at least one component related to the encrypted master key $K\_MAS_{PUF}$ from among the components of the semiconductor device 100 may be included in a secure region SE from which an interface connecting the semiconductor device 100 to the outside is removed and to which access is prohibited from outside the semiconductor device 100. For example, as shown in FIG. 12, the cryptographic engine 130, the master key manager 140, the PUF key generator 150, and the master key storage 160 may be included in the secure region SE.

Figure 13:
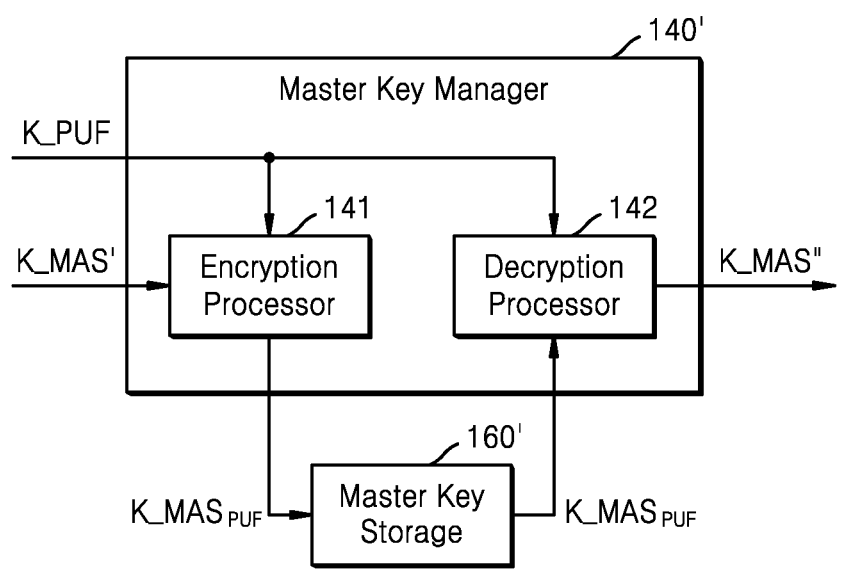
FIG. 13 is a block diagram illustrating an example of a master key manager of FIG. 12, according to some embodiments of the present inventive concept.

FIG. 13 is a block diagram illustrating an example of the master key manager 140 of FIG. 12, according to example embodiments. As described above with reference to FIG. 12, a master key manager 140' of FIG. 13 may receive a PUF key K_PUF and a master key K_MAS', provide or receive an encrypted master key K_MAS$_{PUF}$ to or from a master key storage 160', and provide a master key K_MAS" to the cryptographic engine 130 described with reference to FIG. 12. Referring to FIG. 13, the master key manager 140' may include an encryption processor 141 and a decryption processor 142. The example of FIG. 13 will now be described in more detail with reference to FIG. 12.

The encryption processor 141 may generate the encrypted master key K_MAS$_{PUF}$ by encrypting the master key K_MAS' with the PUF key K_PUF. For example, the encryption processor 141 may request the PUF key generator 150 to generate the PUF key K_PUF in response to receiving the master key K_MAS' and encrypt the master key K_MAS' by using the PUF key K_PUF received from the PUF key generator 150. The encryption processor 141 may then generate the encrypted master key K_MAS$_{PUF}$ by using an encryption technique. In some embodiments, the encryption technique used by the encryption processor 141 may not be shared with demanders of the semiconductor device 100. In some embodiments, similar to the master key generator 320 described above with reference to FIG. 3, the encryption processor 141 may perform an operation of generating the encrypted master key K_MAS$_{PUF}$ once in order to save processing time and resources by the encryption processor 141 as well as prevent the master key K_MAS' generating operation from being leaked to an attacker. Once generated, the encrypted master key K_MAS$_{PUF}$ may be stored and used as necessary. For example, after generating the encrypted master key K_MAS$_{PUF}$, the encryption processor 141 may be disabled (e.g. fused) so as not to generate the encrypted master key K_MAS$_{PUF}$ again. The encryption processor 141 may provide the encrypted master key K_MAS$_{PUF}$ to the master key storage 160' for storage.

The decryption processor 142 may generate the master key K_MAS" by decrypting the encrypted master key K_MAS$_{PUF}$ with the PUF key K_PUF. For example, the decryption processor 142 may request the PUF key generator 150 to generate the PUF key K_PUF in response to a request from the cryptographic engine 130 of FIG. 12 and read the encrypted master key K_MAS$_{PUF}$ from the master key storage 160'. The decryption processor 142 may then decrypt the encrypted master key K_MAS$_{PUF}$ with the PUF key K_PUF by using a decryption technique corresponding to the encryption technique used by the encryption processor 141. In some embodiments, the decryption technique used by the decryption processor 142 may not be shared with demanders of the semiconductor device 100.

Figure 14:
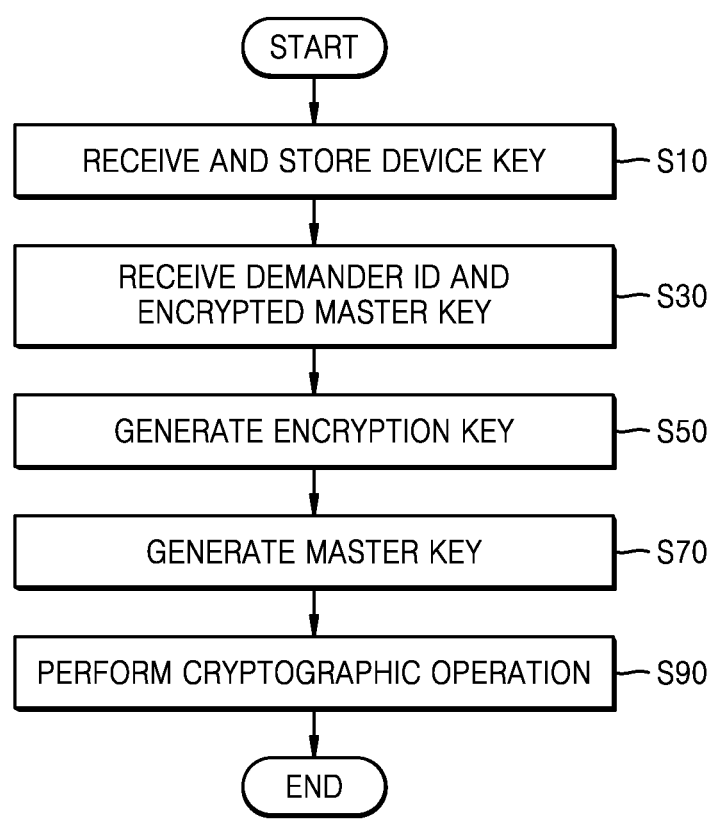
FIG. 14 is a flowchart of a method of provisioning secure information, according to some embodiments of the present inventive concept.

FIG. 14 is a flowchart of a method of provisioning secure information, according to example embodiments. In detail, FIG. 14 illustrates a method of operating a semiconductor device into which secure information is provisioned. For example, the method of FIG. 14 may be performed by the semiconductor device 300 of FIG. 3 and will now be described in more detail with reference to FIGS. 3 and 4.

Referring to FIG. 14, an operation of receiving and storing a device key may be performed (S10). For example, the device key storage 310 may store the device key K_DEV provisioned by the device supplier 30.

An operation of receiving a demander ID and an encrypted master key may be performed (S30). For example, the master key generator 320 may receive the demander data D_DEM provisioned by the primary demander 31, and the demander data D_DEM may contain the primary demander ID ID1 and the encrypted master key K_MAS$_{PRI}$. An example of operation S30 will be described in more detail below with reference to FIG. 15.

An operation of generating an encryption key may be performed (S50). For example, the master key generator 320 may generate the primary key K_PRI' as an encryption key based on the device key K_DEV' and the primary demander ID ID1 included in the demander data D_DEM. An example of operation S50 will be described in more detail with reference to FIG. 15.

An operation of generating a master key may be performed (S70). For example, the master key generator 320 may generate a master key K_MAS' by decrypting the encrypted master key K_MAS$_{PRI}$ received in operation S30 with the encryption key generated in operation S50, i.e., the primary key K_PRI'.

A cryptographic operation may be performed (S90). For example, the cryptographic engine 330 may perform cryptographic operations based on the master key K_MAS'. As will be described in detail below with reference to FIG. 16, in some embodiments, the cryptographic engine 330 may use, instead of the master key K_MAS' generated in operation S70, the master key K_MAS" generated by encrypting and then decrypting the master key K_MAS'.

Figure 15:
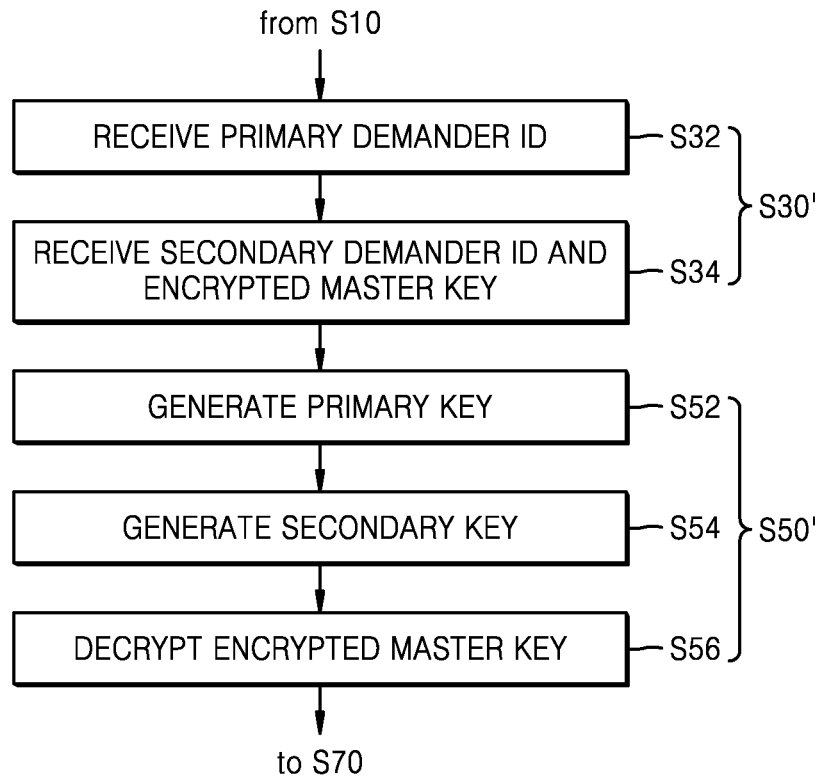
FIG. 15 is a flowchart of a method of provisioning secure information, according to some embodiments of the present inventive concept.

FIG. 15 is a flowchart of a method of provisioning secure information, according to example embodiments. In detail, FIG. 15 illustrates a part of a method of provisioning a master key of a secondary demander that receives a component from a primary demander of a semiconductor device as examples of operations S30 and S50. For example, operations S30' and S50' in FIG. 15 may be performed by the semiconductor device 600 of FIG. 6 and will now be described with reference to FIGS. 6 and 7.

An operation of receiving a demander ID and an encrypted master key may be performed (S30'). Referring to FIG. 15, operation S30' may include operations S32 and S34. An operation of receiving a primary demander ID may be performed (S32). For example, the master key generator 620 may receive the demander data D_DEM provisioned by the secondary demander 62, and the demander data D_DEM may contain the primary demander ID ID1. Furthermore, as described above with reference to FIG. 9, in some embodiments, the master key generator 620 may receive demander data that is provisioned by the primary demander 61 and contains the primary demander ID ID1. An operation of receiving a secondary demander ID and an encrypted master key may be performed (S34). For example, the master key generator 620 may receive the demander data D_DEM provisioned by the secondary demander 62, and the demander data D_DEM may include the secondary demander ID ID2 and the encrypted master key K_MAS SEC.

An operation of generating an encryption key may be performed (S50'). As illustrated in FIG. 15, operation S50' may include operations S52, S54, and S56. An operation of generating a primary key may be performed (S52). For example, the master key generator may generate a primary key K_PRI' based on the device key K_DEV' and the primary demander ID ID1. An operation of generating a secondary key may be performed (S54). For example, the master key generator 620 may generate the secondary key K_SEC' based on the primary key K_PRI' and the secondary demander ID ID2, and the secondary key K_SEC' may function as an encryption key. Thereafter, an operation of decrypting the encrypted master key may be performed (S56). For example, the master key generator 620 may decrypt the encrypted master key K_MAS$_{SEC}$ with the secondary key generated in operation S54.

Figure 16:
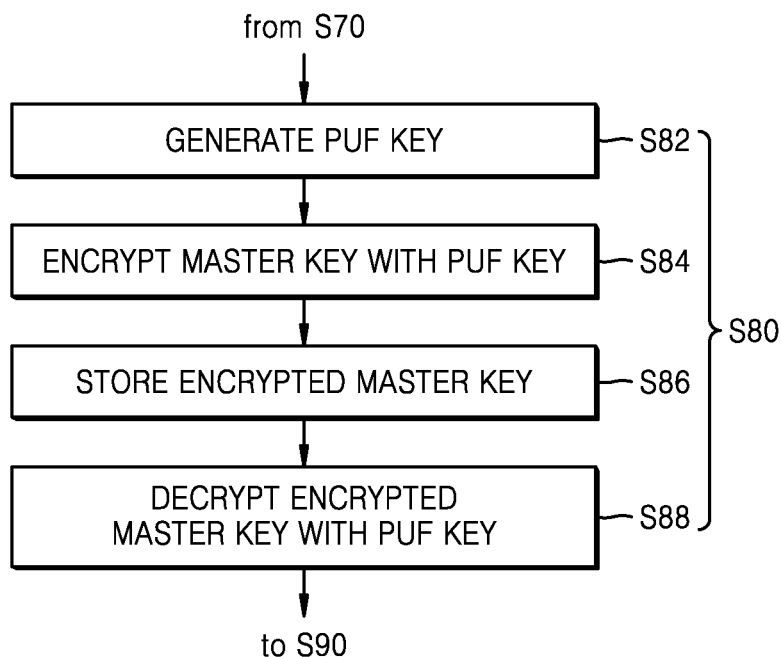
FIG. 16 is a flowchart of a method of provisioning secure information, according to some embodiments of the present inventive concept.

FIG. 16 is a flowchart of a method of provisioning secure information, according to example embodiments. In detail, FIG. 16 illustrates operation S80 that may be performed between operations S70 and S90 described with reference to FIG. 14 to securely maintain a master key. Referring to FIG. 16, operation S80 may include operations S82, S84, S86, and S88. For example, operation S80 in FIG. 16 may be performed by the semiconductor device 100 described with reference to FIG. 12, and the method of FIG. 16 will now be described in detail with reference to FIG. 12

An operation of generating a PUF key may be performed (S82). For example, the PUF key generator 150 may generate a PUF key K_PUF from PUF bits during runtime. In some embodiments, the PUF key generator 150 may generate the PUF key K_PUF in response to a request from the master key manager 140.

An operation of encrypting a master key with the PUF key may be performed (S84). For example, the master key manager 140 may generate an encrypted master key K_MAS$_{PUF}$ by encrypting the master key K_MAS' received from the master key generator 120 with the PUF key K_PUF.

An operation of storing the encrypted master key may be performed (S86). For example, the master key manager 140 may provide the encrypted master key K_MAS$_{PUF}$ generated in operation S84 to the master key storage 160 for storage. Even when the encrypted master key K_MAS$_{PUF}$ stored in the master key storage 160 is exposed to outside the semiconductor device 100, it may be impossible to obtain the master key K_MAS from the encrypted master key K_MAS$_{PUF}$ generated using the PUF key K_PUF.

An operation of decrypting the encrypted master key with the PUF key may be performed (S88). For example, the master key manager 140 may read the encrypted master key K_MAS$_{PUF}$ from the master key storage 160 in response to a request from the cryptographic engine 130 and request the PUF key K_PUF from the PUF key generator 150. The master key manager 140 may generate the master key K_MAS" by decrypting the encrypted master key K_MAS$_{PUF}$ with the PUF key K_PUF and provide the master key K_MAS" to the cryptographic engine 130.

The terminology used herein is for the purpose of describing particular embodiments only and is not intended to limit the meaning thereof or the scope of the inventive concept defined by the following claims. While the inventive concept has been particularly shown and described with reference to example embodiments thereof, it will be understood by those of ordinary skill in the art that various changes and equivalents in form and details may be made therein without departing from the spirit and scope of the inventive concept as defined by the following claims.

What is claimed is:

1. A semiconductor device configured to provision secure information of a demander, the semiconductor device comprising:
   a device key storage configured to store a device key provisioned by a supplier of the semiconductor device;
   a master key generator configured to generate, based on the device key and demander data provisioned by the demander, a master key of the demander by using a first operation shared with the supplier and a second operation shared with the demander, wherein the demander data comprises at least one demander identifier and an encrypted master key; and
   a cryptographic engine configured to perform a cryptographic operation based on the master key,
   wherein the master key generator comprises:
      a decryption processor configured to decrypt the encrypted master key using an encryption key that was generated based on the device key and the at least one demander identifier.

2. The semiconductor device of claim 1, wherein the encryption key is generated using a key derivation function (KDF) that takes the device key and the at least one demander identifier as input.

3. The semiconductor device of claim 1,
   wherein the demander data comprises a primary demander identifier and a secondary demander identifier, and
   wherein the encryption key is generated based on a primary key that was generated based on the device key and the primary demander identifier, and the secondary demander identifier.

4. The semiconductor device of claim 1, wherein the master key generator is further configured to perform an operation of generating the master key a single time in response to provisioning of the demander data.

5. The semiconductor device of claim 1, further comprising:
   a master key storage configured to store a physically unclonable function (PUF) master key encrypted with a PUF key that was generated based on PUF bits.

6. The semiconductor device of claim 5, further comprising:
   a master key manager configured to encrypt the master key by using the PUF key to generate a PUF encrypted master key and decrypt the PUF master key stored in the master key storage by using the PUF key to generate a decrypted master key,
   wherein the cryptographic engine is further configured to receive the decrypted master key from the master key manager.

7. The semiconductor device of claim 6, wherein the master key storage, the master key manager, and the cryptographic engine are included in a secure region that does not include an interface from outside of the semiconductor device.

8. The semiconductor device of claim 1, wherein the device key storage comprises a one time programmable (OTP) fuse array.

9. A method of operating a semiconductor device for provisioning secure information of a demander, the method comprising:
   receiving and storing a device key;
   receiving at least one demander identifier and an encrypted master key of the demander;
   generating an encryption key based on the device key and the at least one demander identifier;
   generating a master key by decrypting the encrypted master key with the encryption key; and
   performing a cryptographic operation based on the master key.

10. The method of claim 9, wherein the generating of the encryption key comprises generating the encryption key based on the device key and a primary demander identifier that is one of the at least one demander identifier using operations associated with a supplier of the semiconductor device to generate the encryption key.

11. The method of claim 10,
wherein the generating of the encryption key comprises generating the encryption key by using a key derivation function (KDF), and
wherein the KDF includes input comprising the device key and the at least one demander identifier.

12. The method of claim 10, wherein the receiving of the at least one demander identifier and the encrypted master key comprises receiving a primary demander identifier and a secondary demander identifier, and
wherein the generating of the encryption key comprises:
generating a primary key based on the device key and the primary demander identifier; and
generating the encryption key based on the primary key and the secondary demander identifier.

13. The method of claim 9, wherein the generating of the encryption key and the generating of the master key are each performed a single time in response to the receiving of the encrypted master key.

14. The method of claim 9, further comprising:
generating a physically unclonable function (PUF) key based on PUF bits;
encrypting the master key with the PUF key; and
storing an encrypted master key in a master key storage.

15. The method of claim 14, further comprising:
decrypting the encrypted master key stored in the master key storage by using the PUF key,
wherein the performing of the cryptographic operation comprises performing the cryptographic operation based on a master key generated by decrypting the encrypted master key with the PUF key.

* * * * *